(12) United States Patent
Matsumura

(10) Patent No.: US 9,307,077 B2
(45) Date of Patent: Apr. 5, 2016

(54) COMMUNICATION SYSTEM

(71) Applicant: Yoshihiro Matsumura, Tokyo (JP)

(72) Inventor: Yoshihiro Matsumura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/386,750

(22) PCT Filed: Mar. 26, 2013

(86) PCT No.: PCT/JP2013/002049
§ 371 (c)(1),
(2) Date: Sep. 19, 2014

(87) PCT Pub. No.: WO2013/145718
PCT Pub. Date: Oct. 3, 2013

(65) Prior Publication Data
US 2015/0072664 A1 Mar. 12, 2015

(30) Foreign Application Priority Data
Mar. 28, 2012 (JP) .................... 2012-073349

(51) Int. Cl.
H04M 3/42 (2006.01)
H04Q 3/60 (2006.01)
H04M 3/436 (2006.01)
H04W 76/02 (2009.01)
H04M 3/54 (2006.01)

(52) U.S. Cl.
CPC ...... *H04M 3/42348* (2013.01); *H04M 3/42059* (2013.01); *H04M 3/4365* (2013.01); *H04M 3/548* (2013.01); *H04Q 3/60* (2013.01); *H04W 76/02* (2013.01); *H04M 3/42263* (2013.01); *H04M 2242/30* (2013.01); *H04Q 2213/1322* (2013.01); *H04Q 2213/13098* (2013.01); *H04Q 2213/13196* (2013.01); *H04Q 2213/13384* (2013.01); *H04Q 2213/13399* (2013.01)

(58) Field of Classification Search
None
See application file for complete search history.

(56) References Cited

U.S. PATENT DOCUMENTS

| 8,983,056 B2 * | 3/2015 | Kim | H04M 3/42 |
| | | | 379/373.01 |
| 9,042,528 B2 * | 5/2015 | Mairs | H04M 3/53366 |
| | | | 379/88.22 |
| 2006/0093121 A1 | 5/2006 | Sylvain | |
| 2006/0199540 A1 | 9/2006 | Oh-Yang et al. | |

FOREIGN PATENT DOCUMENTS

| CN | 1890999 A | 1/2007 |
| JP | 08-163640 | 6/1996 |
| JP | 09-191494 | 7/1997 |
| JP | 2006-013684 | 1/2006 |
| JP | 2009-100391 | 5/2009 |
| WO | WO-2006/043135 A1 | 4/2006 |
| WO | WO-2008/053836 | 5/2008 |

OTHER PUBLICATIONS

International Search Report corresponding to PCT/JP2013/002049, mail date May 7, 2013, 2 pages.

* cited by examiner

*Primary Examiner* — Adolf Dsouza
(74) *Attorney, Agent, or Firm* — Wilmer Cutler Pickering Hale and Dorr LLP

(57) ABSTRACT

Provided is a mobile communication terminal, including a used device information storing unit, a location information acquiring unit, and a used device information transmitting unit. The mobile communication terminal specifies a communication device to be used depending on a location, acquired by the location information acquiring unit or stored by the used device information storing unit, and transmits the relevant information to a connection control device. Also provided is a connection control device, which includes a connection controlling unit. The connection controlling unit, based on information received from the mobile terminal, performs connection control.

24 Claims, 15 Drawing Sheets

COMMUNICATION SYSTEM

CROSS-REFERENCE TO RELATED APPLICATIONS

This application is a national stage application of International Application No. PCT/JP2013/002049 entitled "COMMUNICATION SYSTEM" filed on Mar. 26, 2013, which claims priority to Japanese Patent Application No. 2012-073349 filed on Mar. 28, 2012, the disclosure of which is hereby incorporated by reference in their entirety.

TECHNICAL FIELD

The present invention relates to a communication system. More specifically, the present invention relates to a communication system that includes a connection control device controlling connection between given communication terminals and a mobile communication terminal capable of performing communication with the connection control device.

BACKGROUND ART

In recent years, development in communication technology has enabled a company to have a plurality of bases, and has enabled employees, namely users, to move to the respective bases and conduct business by using information processing devices connected to a network. For example, in each of the bases where the users go, extension terminals (including hard phone terminals, wireless terminals, etc.) that can be used by the users are set up, or information processing terminals such as personal computers with soft phone extensions installed, respectively, are set up. Moreover, each of the users has a mobile information processing terminal such as a cell phone, and can talk and transmit/receive data by using the mobile information processing terminal.

The abovementioned environment enables the user to select a terminal to use depending on his/her current location. When originating a call, the user can use any of the terminals. On the other hand, the user previously registers information for designating a terminal that he/she uses to receive a call into a connection control device such as a private exchange or connection control server installed in the company and, when the user is called, the user can receive a call by using the terminal registered in the connection control device.

Patent Document 1 discloses a technique relating to incoming call transfer described above. To be specific, Patent Document 1 discloses a technique that a mobile terminal performs location registration every time a location registration area changes and transfers a call for the mobile terminal to a previously registered transfer destination corresponding to location registration. This enables automatic change of the transfer destination of an incoming call.

Patent Document 1: Japanese Unexamined Patent Application Publication No. 1996-163640

However, the abovementioned technique requires previous registration of a transfer destination corresponding to the location of a mobile terminal into a device performing connection control. Therefore, in a case where the user has not performed the registration, a call for the user's mobile terminal cannot be transferred to a desired transfer destination. Consequently, there arises a problem that it is impossible to achieve increase of convenience for the user in use of a communication device.

Further, though the user uses a terminal freely selected by him/her when originating a call, it is desirable that the user can automatically use a desired terminal depending on his/her location in terms of communication fees, the quality of communication, convenience of terminals, and so on. However, there is no description about this in the abovementioned Patent Document. Consequently, just like the above description, there arises the problem that it is impossible to achieve increase of convenience for the user in use of a communication device.

SUMMARY

Accordingly, an object of the present invention is to provide a communication system, a mobile communication terminal, a connection control device, a program, and a communication control method, which solve the abovementioned problem that it is impossible to achieve increase of convenience for the user in use of a communication device.

A communication system as an aspect of the present invention includes:

a connection control device performing connection control between given communication devices; and a mobile communication terminal capable of communicating with the connection control device.

The mobile communication terminal includes:

a used device information storing means for previously associating and storing designated location information designating a given location and used device information specifying a communication device to be used depending on a location;

a location information acquiring means for acquiring location information representing a location of the terminal itself; and a used device information transmitting means for transmitting the used device information associated with the designated location information corresponding to the location information acquired by the location information acquiring means, to the connection control device.

The connection control device includes a connection controlling means for considering a communication device corresponding to the used device information transmitted from the mobile communication terminal as a communication device to be used by a user operating the mobile communication terminal having transmitted the used device information, and performing connection control of the communication device.

Further, a mobile communication terminal as another aspect of the present invention is a mobile communication terminal capable of communicating with a connection control device performing connection control between given communication devices.

The mobile communication terminal includes:

a used device information storing means for previously associating and storing designated location information designating a given location and used device information specifying a communication device to be used depending on a location;

a location information acquiring means for acquiring location information representing a location of the terminal itself; and a used device information transmitting means for transmitting the used device information associated with the designated location information corresponding to the location information acquired by the location information acquiring means, to the connection control device.

The used device information transmitting means is configured to transmit the used device information to the connection control device so that a communication device corresponding to the used device information is, as a communication device to be used by a user operating the terminal itself, subjected to connection control by the connection control device.

Further, a program as another aspect of the present invention is a computer program including instructions for causing a mobile communication terminal, which is capable of communicating with a connection control device performing connection control between given communication devices and which includes a used device information storing means for previously associating and storing designated location information designating a given location and used device information specifying a communication device to be used depending on a location, to realize:

a location information acquiring means for acquiring location information representing a location of the terminal itself; and a used device information transmitting means for transmitting the used device information associated with the designated location information corresponding to the location information acquired by the location information acquiring means, to the connection control device.

The computer program also includes instructions for realizing that the used device information transmitting means is configured to transmit the used device information to the connection control device so that a communication device corresponding to the used device information is, as a communication device to be used by a user operating the terminal itself, subjected to connection control by the connection control device.

Further, a connection control device as another aspect of the present invention is a connection control device performing connection control between given communication devices.

The connection control device includes a connection controlling means for: receiving used device information from a mobile communication terminal capable of communicating, the used device information corresponding to location information of the mobile communication terminal acquired by the mobile communication terminal and being previously stored in the mobile communication terminal, and the used device information specifying a communication device to be used depending on a location; considering a communication device corresponding to the received used device information as a communication device to be used by a user operating the mobile communication terminal having transmitted the used device information; and performing connection control of the communication device.

Further, a program as another aspect of the present invention is a computer program including instructions for causing a connection control device, which performs connection control between given communication devices, to realize a connection controlling means for: receiving used device information from a mobile communication terminal capable of communicating, the used device information corresponding to location information of the mobile communication terminal acquired by the mobile communication terminal and being previously stored in the mobile communication terminal, and the used device information specifying a communication device to be used depending on a location; considering a communication device corresponding to the received used device information as a communication device to be used by a user operating the mobile communication terminal having transmitted the used device information; and performing connection control of the communication device.

Further, a communication control method as another aspect of the present invention is a communication control method for communication control by a communication system including a connection control device performing connection control between given communication devices and a mobile communication terminal capable of communicating with the connection control device.

The communication control method includes:

by the mobile communication terminal, acquiring location information representing a location of the terminal itself, and based on previously associated and stored designated location information and used device information, transmitting the used device information associated with the designated location information corresponding to the acquired location information to the connection control device, the designated location information designating a given location, and the used device information specifying a communication device to be used depending on a location; and by the connection control device, considering a communication device corresponding to the used device information transmitted from the mobile communication terminal as a communication device to be used by a user operating the mobile communication terminal having transmitted the used device information, and performing connection control of the communication device.

Further, a communication control method as another aspect of the present invention is a communication control method for communication control by a mobile communication terminal capable of communicating with a connection control device performing connection control between given communication devices.

The communication control method includes:

acquiring location information representing a location of the terminal itself; and based on previously associated and stored designated location information and used device information, transmitting the used device information associated with the designated location information corresponding to the acquired location information to the connection control device, and also transmitting the used device information to the connection control device so that a communication device corresponding to the used device information is, as a communication device to be used by a user operating the terminal itself, subjected to connection control by the connection control device, the designated location information designating a given location, and the used device information specifying a communication device to be used depending on a location.

Further, a communication control method as another aspect of the present invention is a communication control method for communication control by a connection control device performing connection control between given communication devices.

The communication control method includes:

receiving used device information from a mobile communication terminal capable of communicating, the used device information corresponding to location information of the mobile communication terminal acquired by the mobile communication terminal and being previously stored in the mobile communication terminal, and the used device information specifying a communication device to be used depending on a location;

considering a communication device corresponding to the received used device information as a communication device to be used by a user operating the mobile communication terminal having transmitted the used device information; and performing connection control of the communication device.

With the configuration as described above, the present invention can achieve increase of convenience for the user in use of a communication device.

EXEMPLARY EMBODIMENTS

First Exemplary Embodiment

Figure 6:
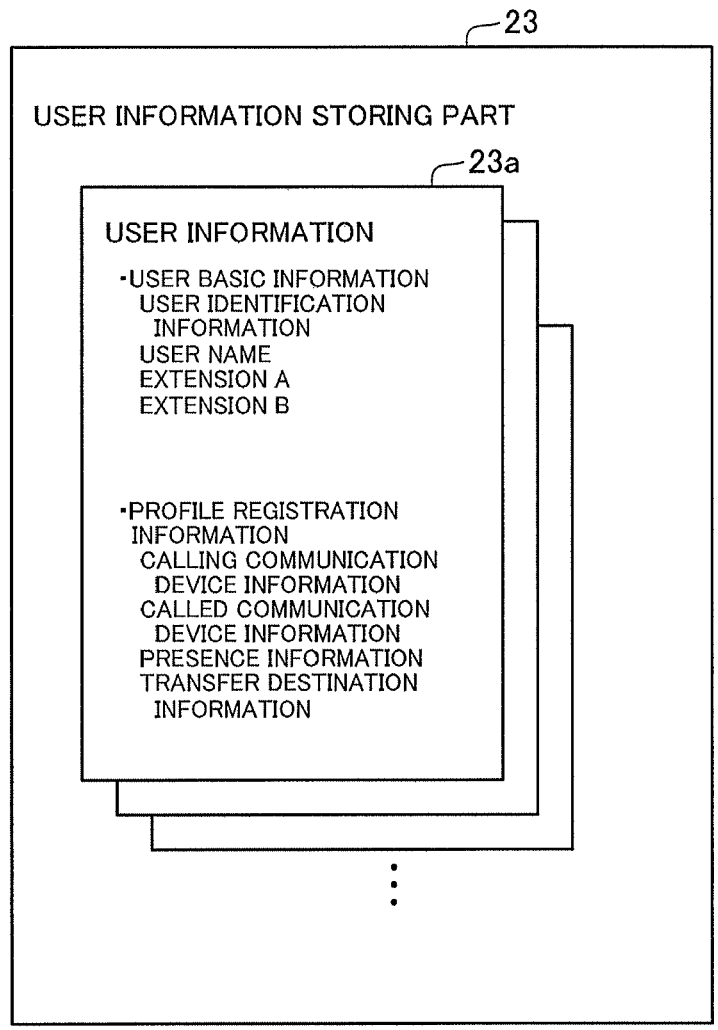
FIG. 6 is a diagram showing an example of information stored in a user information storing part disclosed in FIG. 5.
Figure 7:
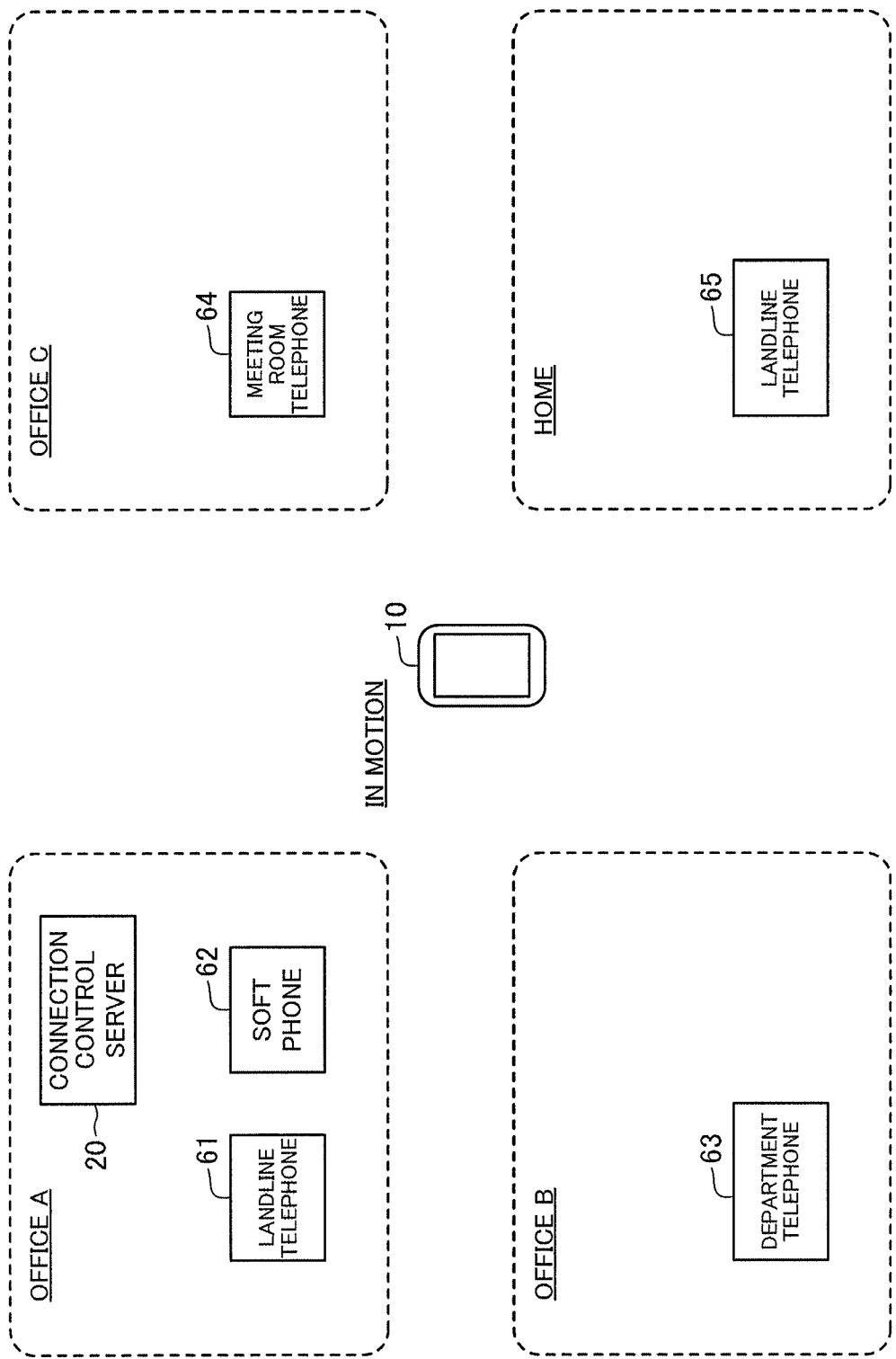
FIG. 7 is a diagram showing a specific configuration example of the communication system disclosed in FIG. 1.
Figure 8:
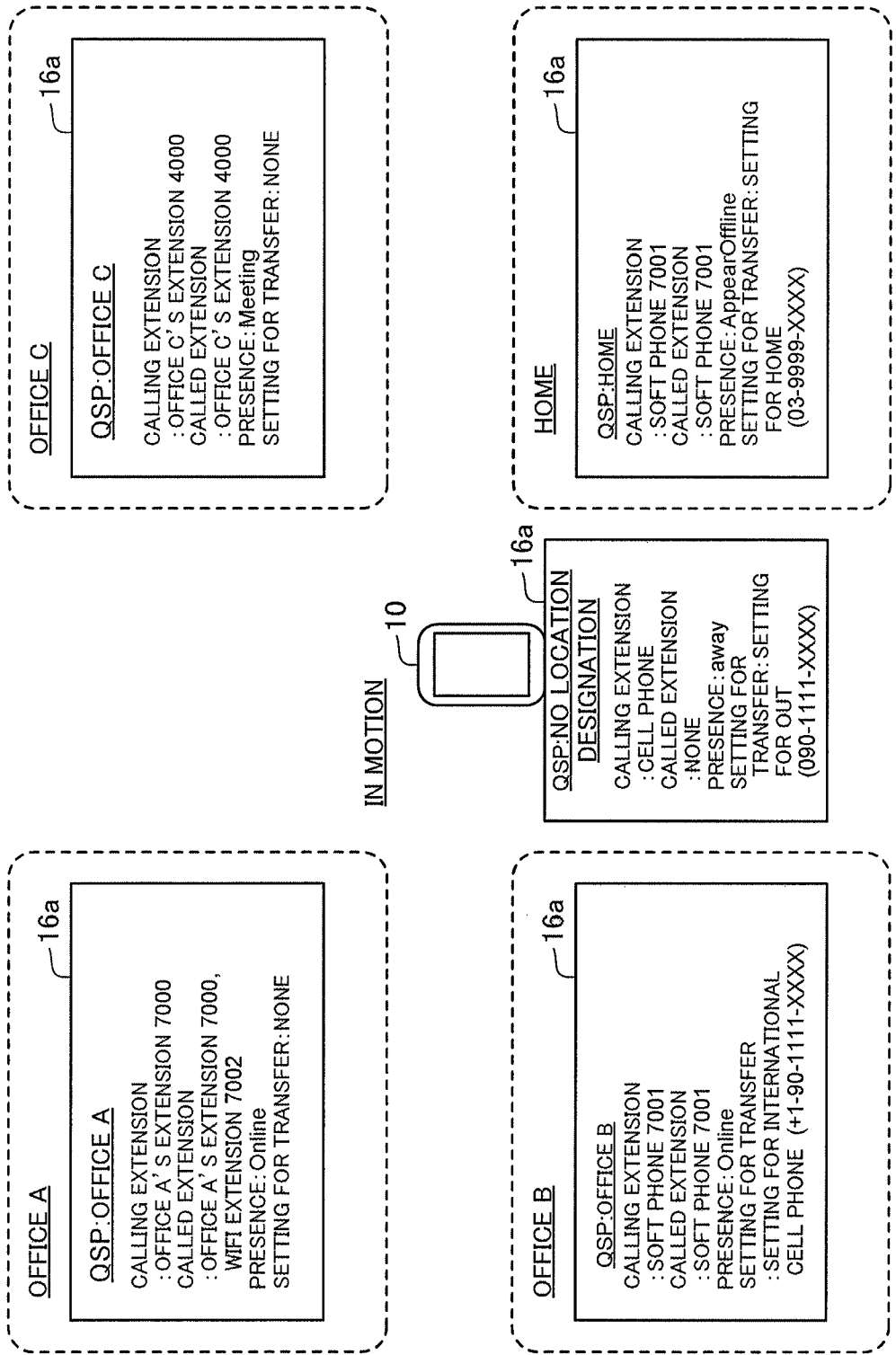
FIG. 8 is a diagram showing a specific configuration example of the communication system disclosed in FIG. 1.
Figure 13:
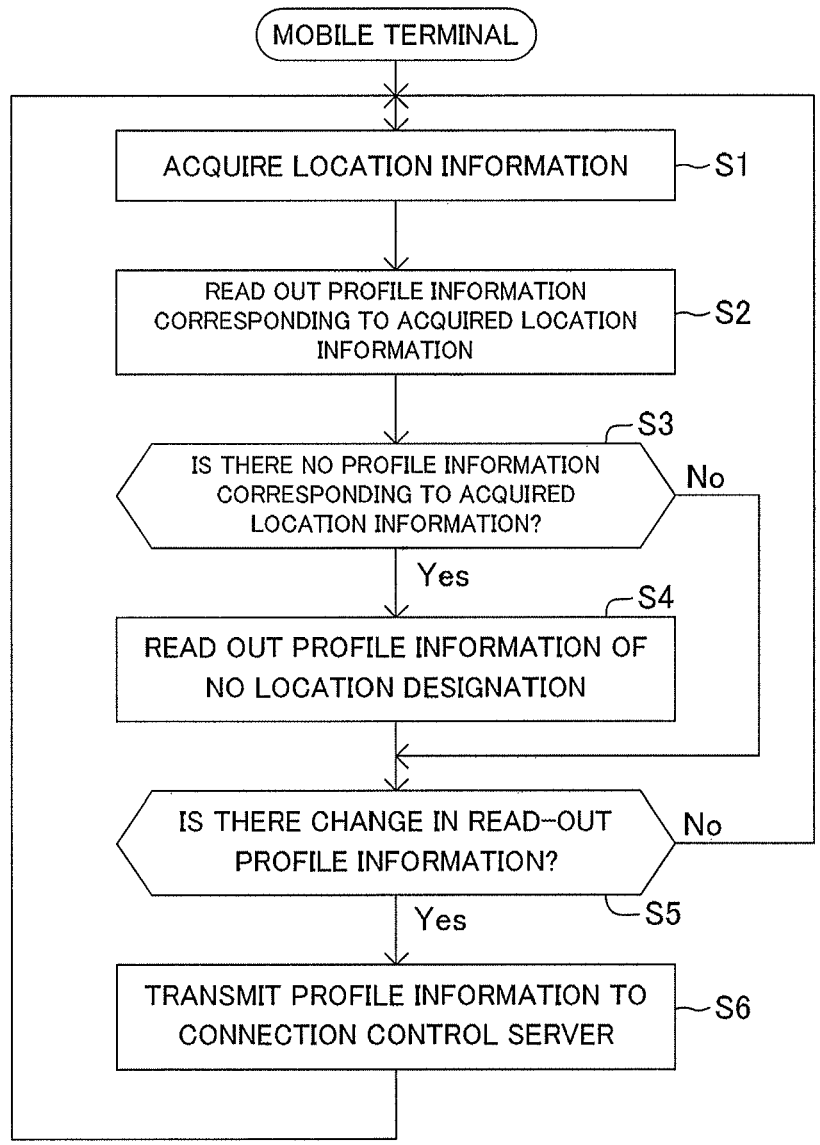
FIG. 13 is a flowchart showing the operation of the mobile terminal disclosed in FIG. 1.
Figure 14:
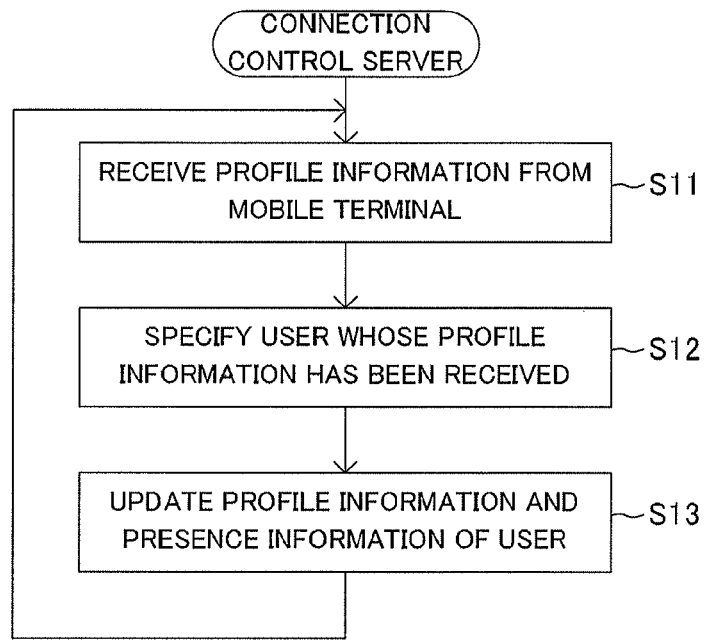
FIG. 14 is a flowchart showing the operation of the connection control server disclosed in FIG. 1.
Figure 15:
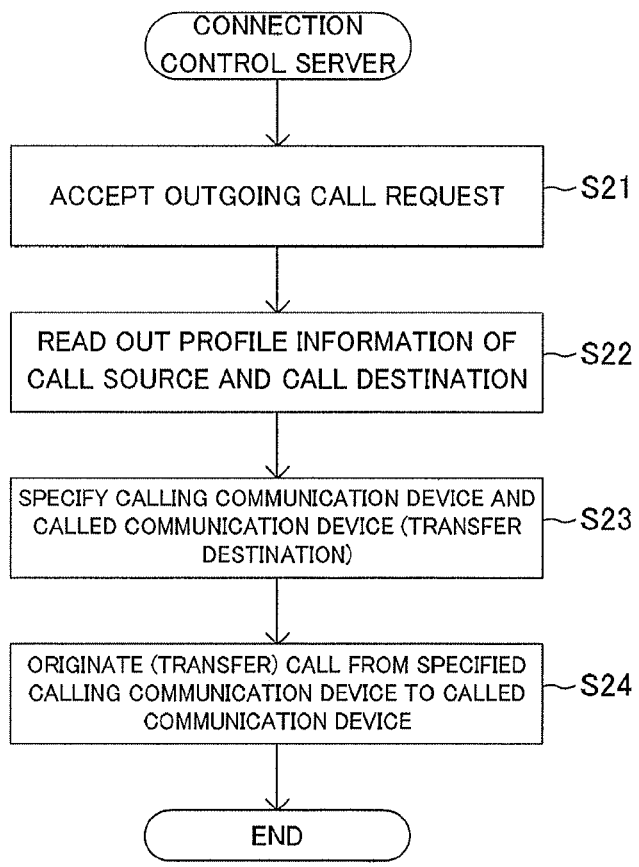
FIG. 15 is a flowchart showing the operation of the connection control server disclosed in FIG. 1.

A first exemplary embodiment of the present invention will be described referring to FIGS. 1 to 15. FIGS. 1 to 6 are diagrams for describing the configuration of a communication system. FIGS. 7 and 8 are diagrams showing a specific example of the communication system, and FIGS. 9 to 12 are diagrams showing the configuration and operation in the specific example of the communication system. FIGS. 13 to 15 are flowcharts showing the operation of a mobile terminal and a connection control server that configure the communication system.

[Configuration]

Figure 1:
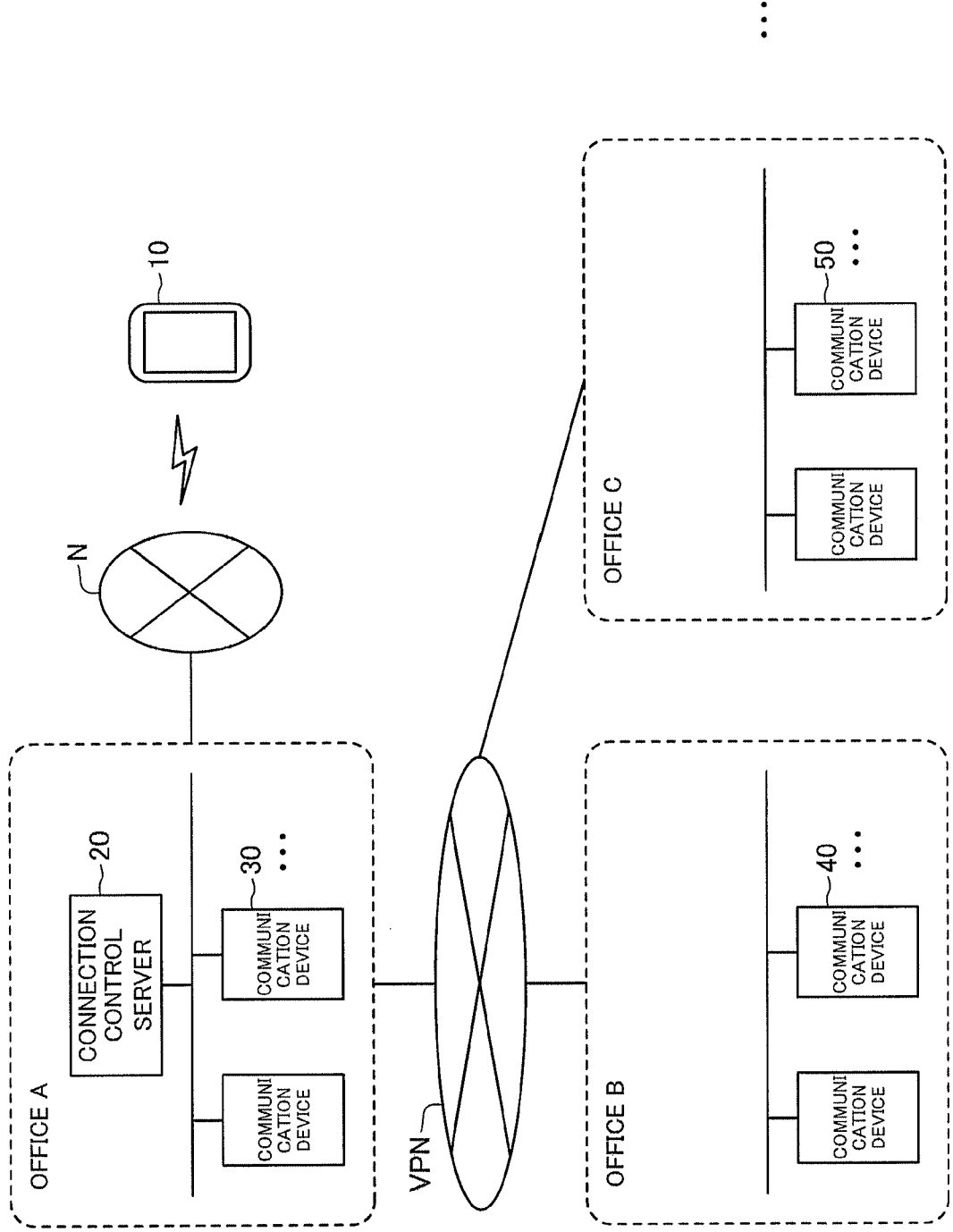
FIG. 1 is a block diagram showing the overall configuration of a communication system according to a first exemplary embodiment of the present invention.

As shown in FIG. 1, the communication system according to this exemplary embodiment includes a mobile terminal 10 (a mobile communication terminal) operated by a predetermined user, a connection control server 20 (a connection control device) capable of performing communication with the mobile terminal 10 via a network, and communication devices 30, 40 and 50 that are under connection control by the connection control server 20. The mobile terminal 10 can be connected to the connection control server 20 via a wireless and/or wired network N such as a mobile telephone network and an Internet network. The communication devices 30, 40 and 50 are connected to LANs (Local Area Networks) within offices A, B and C, respectively, and the LANs within the offices A, B and C are connected via a VPN (Virtual Private Network). Therefore, the respective communication devices 30, 40 and 50 are connected with each other under the connection control server 20, and are under connection control by the connection control server 20. The offices A, B and C may be connected via any network. Below, each component will be described in detail.

Figure 2:
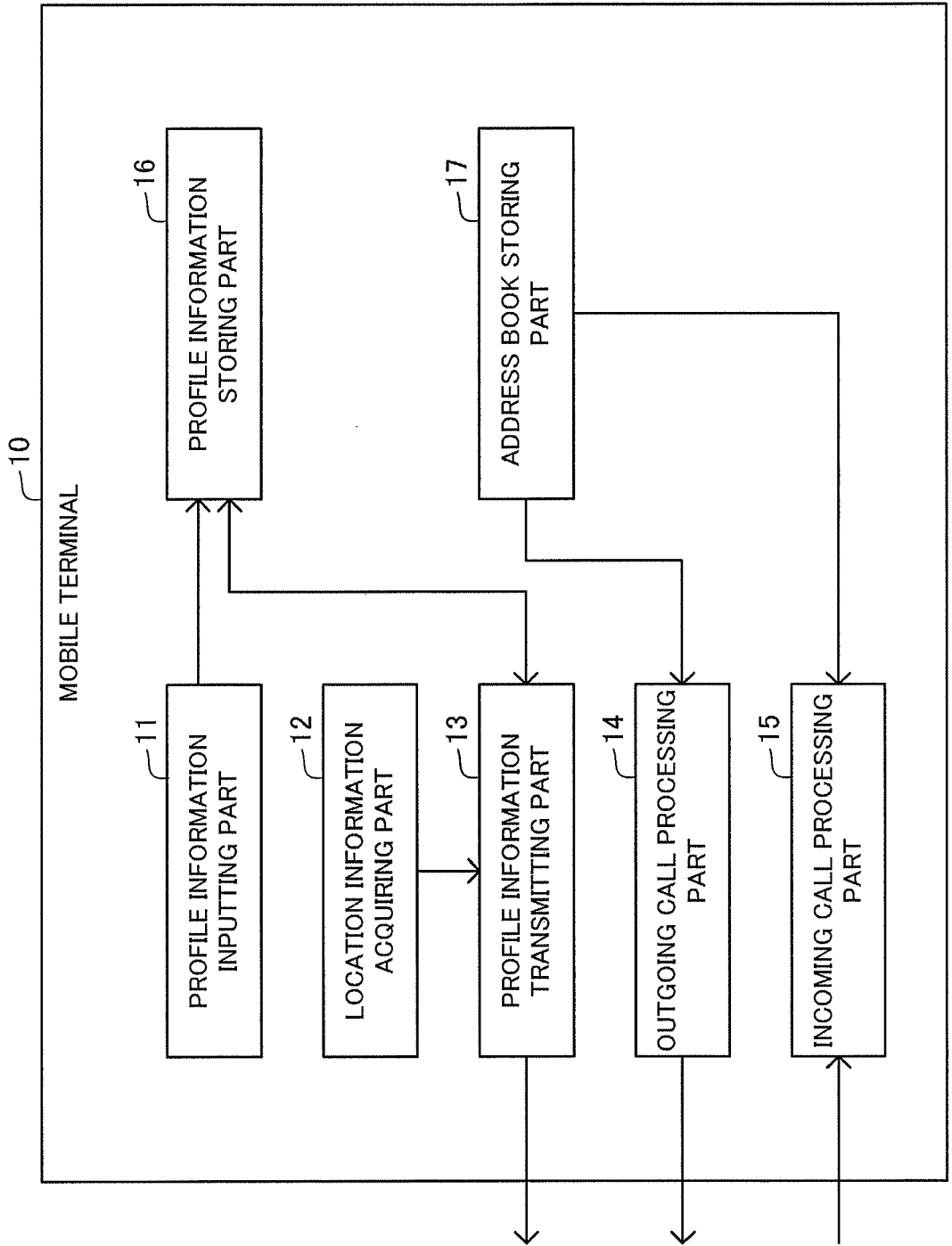
FIG. 2 is a function block diagram showing the configuration of a mobile terminal disclosed in FIG. 1.

The mobile terminal 10 (the mobile communication terminal) is a communication terminal such as a cell phone operated by a predetermined user. As shown in FIG. 2, the mobile terminal 10 includes a profile information inputting part 11, a location information acquiring part 12, a profile information transmitting part 13, an outgoing call processing part 14, and an incoming call processing part 15, which are constructed by installation of a program into a mounted arithmetic device. Moreover, the mobile terminal 10 includes a profile information storing part 16 and an address book storing part 17, which are formed in a mounted storage device.

Figure 3:
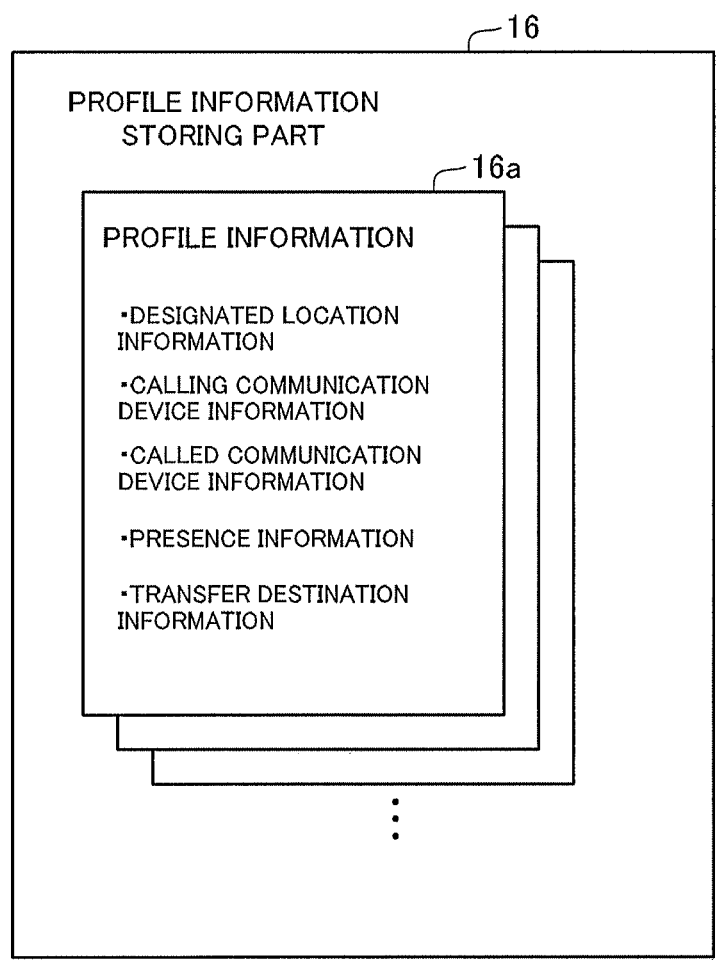
FIG. 3 is a diagram showing an example of information stored in a profile information storing part disclosed in FIG. 2.

The profile information inputting part 11 accepts input of profile information by a user operating the mobile terminal 10 through an input device such as a keyboard (including a software keyboard) mounted on the mobile terminal 10 or through another connected device, and stores the profile information into the profile information storing part 16. As shown in FIG. 3, profile information 16a contains "designated location information" designating a predetermined location, and contains information specifying a communication terminal used by the user operating the mobile terminal 10 at a location represented by the "designated location information." To be specific, the profile information 16a contains "calling communication device information" specifying a communication device used to originate a call and "called communication device information" specifying a communication device used to receive a call, in association with "designated location information." "Designated location information" is expressed by, for example, information indicating the latitude and longitude or information indicating the address. Moreover, "calling communication device information" and "called communication device information" are each expressed by identification information that is given for each communication device and that is for identifying the communication device, and expressed by a telephone number or an extension number in a specific office. Meanwhile, each of the abovementioned information is an example and may be another kind of information.

Further, the profile information 16a contains "transfer destination information" specifying a communication device that is a transfer destination of an incoming call for the user operating the mobile terminal 10 when the user is at a location represented by "designated location information," in association with the "designated location information." As "transfer destination information," for example, the telephone number of the mobile terminal 10 or outgoing call address information on a communication device set up at a location represented by "designated location information" is used. However, such information is an example and another kind of information may be used.

Furthermore, the profile information 16a contains presence information (user status information) that represents the status of the user operating the mobile terminal 10 when the user is at a location represented by "designated location information," in association with the "designated location information." As this "presence information," information registered in a presence server 28 storing and managing the user's current status is used: for example, information "Online" representing a state that the user can access via a network; and information "Meeting" representing that the user is in a meeting. Meanwhile, such information is an example, and another kind of information may be used.

In "designated location information" contained in the profile information 16*a*, information designating a predetermined location does not have to be set. For example, in "designated location information" of the profile information 16*a* representing that the user is in motion, information "no location designation" may be set, or information does not have to be set. Moreover, in each of the information contained in the profile information 16*a*, information does not have to be set necessarily, and no information may be set.

The location information acquiring part 12 (a location information acquiring means) acquires location information of the mobile terminal 10 by using a GPS (Global Positioning System) receiver (not shown in the drawings) mounted in the mobile terminal 10, and transmits the location information to the profile information transmitting part 13. For example, the location information acquiring part 12 acquires location information at predetermined time intervals, or acquires location information at predetermined processing timing. Meanwhile, the location information acquiring part 12 may acquire location information by another method. For example, the location information acquiring part 12 may acquire and use location information received from a wireless base station.

The profile information transmitting part 13 (a used device information transmitting means) searches for "designated location information" that can be judged to coincide with location information acquired by the location information acquiring part 12 described above by a preset criterion, from among "designated location information" stored in the profile information storing part 16. Then, the profile information transmitting part 13 reads out profile information containing the "designated location information" judged to coincide with the acquired location information, and determines whether the read-out profile information is identical to previously read-out profile information. Only when the newly read-out profile information is consequently different from the previously read-out profile information, the profile information transmitting part 13 transmits the newly read-out profile information to the connection control server 20. In other words, when there is a change in the acquired location information, the profile information transmitting part 13 transmits profile information containing "calling communication device information," "called communication device information," "presence information" and "transfer destination information" that are associated with the "designated location information" corresponding to the acquired location information, to the connection control server 20.

In this case, the profile information transmitting part 13 transmits user identification information for identifying the user operating the mobile terminal 10 in addition to the profile information. User identification information can be any information that allows specification of the user, and may be identification information for identifying the mobile terminal 10. Moreover, as described later, user identification information or information corresponding thereto is previously registered in the connection control server 20 so that the connection control server 20 can identify the user by using the user identification information transmitted thereto.

In a case where there is no profile information containing the "designated location information" that can be judged to coincide with the location information acquired by the location information acquiring part 12, the profile information transmitting part 13 reads out profile information containing "designated location information" representing no location designation, from the profile information storing part 16. Then, only when this newly read-out profile information is different from previously read-out profile information, the profile information transmitting part 13 transmits the newly read-out profile information to the connection control server 20 together with the user identification information as described above.

The criterion for the profile information transmitting part 13 to judge whether location information acquired by the location information acquiring part 12 coincides with "designated location information" in profile information is, for example, "the result of calculation of a distance between both the locations based on the latitudes and the longitudes is within a 100-meter radius," "the addresses are the same," or the like. Meanwhile, the profile information transmitting part 13 may judge by another judgment criterion whether location information acquired by the location information acquiring part 12 and "designated location information" in profile information coincide with each other or not.

The outgoing call processing part 14 (a call origination requesting means) transmits call origination request information representing a request for origination of a call for a destination user, to the connection control server 20. To be specific, the outgoing call processing part 14 selects and reads out address information of a destination user from an address book stored in the address book storing part 17 included by the mobile terminal 10, and transmits call origination request information including destination user specification information specifying the destination user included in the address information, to the connection control server 20. In this case, the outgoing call processing part 14 transmits user identification information for identifying the user operating the mobile terminal 10 together with the call origination request information, to the connection control server 20.

Figure 4:
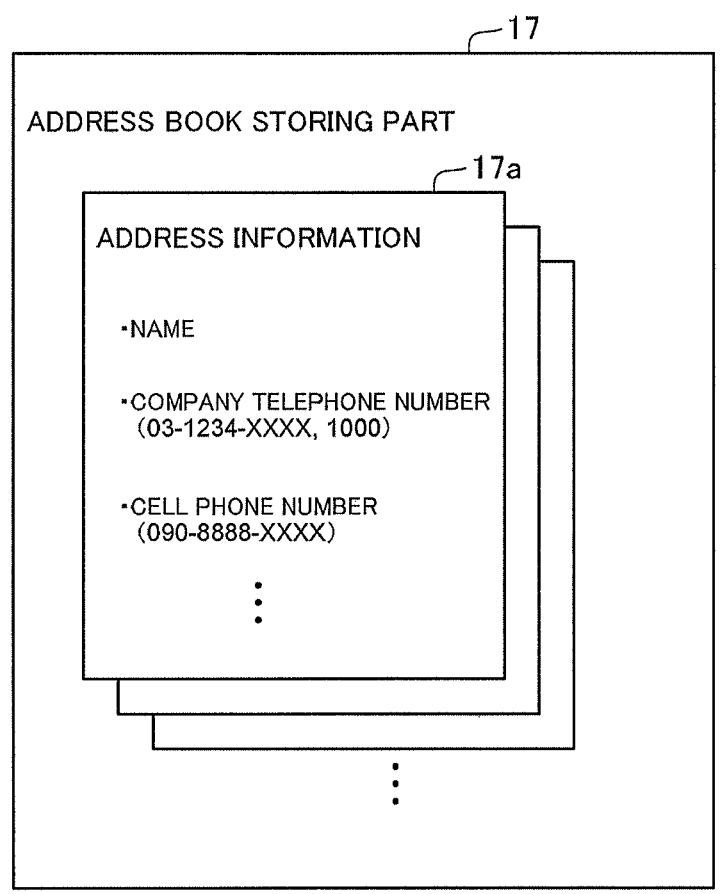
FIG. 4 is a diagram showing an example of information stored in an address book storing part disclosed in FIG. 2.

The address book storing part 17 (a destination user information storing means) stores an address book, which is a bundle of address information 17*a* including the "names" and "telephone numbers" of other users. As the address information 17*a*, for example, as shown in FIG. 4, "company telephone numbers," "cell phone numbers," "e-mail addresses" (not shown), "addresses" (not shown) and so on are stored in association with the "names" of the other users, respectively. The "company telephone number" shown in FIG. 4 contains, for example, a company telephone number like "03-1234-XXXX" and an extension number like "1000" of a communication device in the company used by a specific user. Because the address information 17*a* thus contains destination user specification information of a user of a call destination, selection by the outgoing call processing part 14 as described above enables specification of a destination user and origination of a call from the mobile terminal 10. However, the abovementioned destination user specification information is an example, and may be other information.

The incoming call processing part 15 accepts an incoming call from another communication terminal through connection control by the connection control server 20. In this case, because an incoming call and source user specification information for identifying a communication device of a call source are notified together from the connection control server 20, the incoming call processing part 15 reads out address information of the relevant user from the address book stored in the address book storing part 17, and displays the address information together with the incoming call on the mobile terminal 10.

Besides, the outgoing call processing part 14 and the incoming call processing part 15 each have not only a function of performing connection control to process an outgoing call for a communication device located under the connection control server 20 disclosed in FIG. 1 and an incoming call from the communication device, but also a function of normally originating a call to and receiving a call from other communication terminals that are not under the connection control server 20.

Next, the configuration of the connection control server 20 (a connection control device) will be described. The connection control server 20 is connected to the mobile terminal 10 via the network N so as to be capable of communicating as shown in FIG. 1. Moreover, the connection control server 20 is connected to the LAN within the office A, and can thereby control connection of the communication devices 30, 40 and 50 in the respective offices A, B and C via the VPN.

Figure 5:
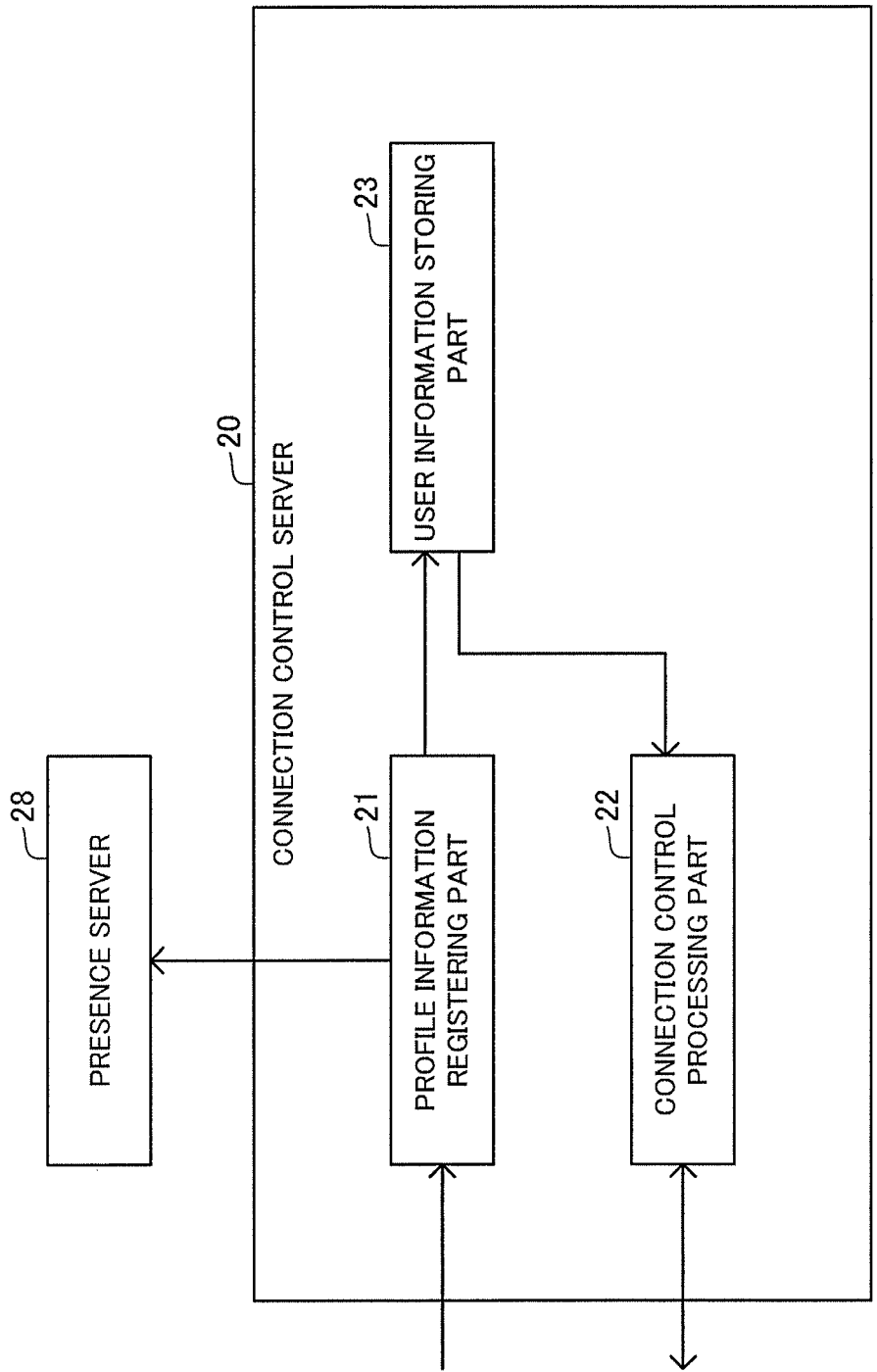
FIG. 5 is a function block diagram showing the configuration of a connection control server disclosed in FIG. 1.

As shown in FIG. 5, the connection control server 20 is constructed by installation of a program into a mounted arithmetic device, and includes a profile information registering part 21 and a connection control processing part 22 both functioning as a connection controlling means for performing connection control between communication devices. Moreover, the connection control server 20 includes a user information storing part 23 formed in a mounted storage device.

The profile information registering part 21 receives profile information transmitted from the profile information transmitting part 13 of the mobile terminal 10 described above, and stores the profile information into the user information storing part 23. To be specific, firstly, based on user identification information received together with the profile information from the mobile terminal 10, the profile information registering part 21 specifies a user having transmitted the profile information. Then, the profile information registering part 21 stores the received profile information included into user information 23a of the specified user in the user information storing part 23, thereby updating the user information 23a. As the user information 23a stored in the user information storing part 23, for example, as shown in FIG. 6, user identification information, a user name, and extension numbers (extensions A and B) are previously stored as "user basic information." In such circumstances, the profile information registering part 21 registers the received profile information (calling communication device information, called communication device information, presence information, transfer destination information) as "profile registration information" in association with the user information 23a having "user basic information" corresponding to the received user identification information as shown in FIG. 6.

Even when "profile registration information" has already been registered in the user information 23a relating to the user whose profile information has been received from the mobile terminal 10, the profile information registering part 21 updates by registering the most newly received profile information as "profile registration information." That is, because profile information is transmitted from the mobile terminal 10 every time the location of the mobile terminal 10 is changed as described above, profile information set so as to correspond to the location of the mobile terminal 10 is updated and registered into the connection control server 20 at all times.

Further, the profile information registering part 21 has a function of, when receiving profile information, updating presence information of a user relating to the profile information. To be specific, the profile information registering part 21 reflects presence information contained in the received profile information, on a presence server 28 connected to the connection control server 20.

The connection control processing part 22 receives call origination request information transmitted from the outgoing call processing part 14 of the mobile terminal 10 or from another communication device, and controls connection between a communication terminal of a call source and a communication terminal of a call destination. To be specific, upon receiving call origination request information, firstly, the connection control processing part 22 extracts user identification information transmitted together with the call origination request information, and specifies the user information 23a of a user making a request for a call. In other words, the connection control processing part 22 reads out the user information 23a storing user identification information corresponding to the user identification information transmitted together with the call origination request information, from the user information storing part 23. Then, the connection control processing part 22 specifies "calling communication device information," "called communication device information" and "transfer destination information" from profile information stored in the read-out user information 23a.

The connection control processing part 22 performs connection control between communication terminals so that a process of originating a call from a communication device corresponding to the specified "calling communication device information" (a calling-side communication device) to a communication device corresponding to the specified "called communication device information" (a called-side communication device) is executed. Moreover, the connection control processing part 22 performs connection control so as to transfer an incoming call to a communication device corresponding to the specified "transfer destination information." Meanwhile, because a connection control process between the specified calling-side communication device and the specified called-side communication device can be realized by a general connection control device, a detailed description thereof will be omitted.

[Operation]

Next, the operation of the abovementioned communication system will be described referring to a specific example of a communication system shown by FIGS. 7 to 12 and flowcharts shown in FIGS. 13 to 15.

It is firstly assumed that a user operating the "mobile terminal 10" shown in FIG. 7 is a "user A." Then, it is assumed that communication devices that can be used by the "user A" are a "landline telephone 61" and a "soft phone 62" that are set up in an "office A," a "department telephone 63" set up in an "office B," a "meeting room telephone 64" set up in an "office C," and a "landline telephone 65" set up at "home" shown in FIG. 7.

Because a communication function of the "soft phone 62" set up in the "office A" shown in FIG. 7 is realized by software installed in a general information processing terminal, it is possible to use the "soft phone 62" by installing the software into an information processing device set up in any place. Moreover, the respective "offices A, B and C" can be connected via the VPN, and therefore, can be subjected to connection control under the connection control server 20 set up in the "office A" shown in FIG. 7. Meanwhile, when an information processing terminal with the abovementioned "soft phone 62" installed can be connected to an Internet network, the "soft phone 62" can be connected via the VPN and can be subjected to connection control under the connection control server 20.

In the communication environment of the "user A" as described above, it is assumed that, in the profile information storing part 16 of the mobile terminal 10 operated by the "user A," profile information (herein, referred to as "QSP (Quick Set Profile)") as shown in FIG. 8 is previously inputted into the mobile terminal 10 by the user A and registered for each designated location. To be specific, as the profile information 16a corresponding to the location of the "office A," "calling extension: office A's extension 7000" as calling communication terminal information, "called extension: office A's extension 7000, WiFi extension 7002" as called communication terminal information, "presence: Online" as presence information and "setting for transfer: none" as transfer destination information are registered in association with "location information that specifies the office A." Moreover, as the profile information 16a of the "user A" in motion, namely in a non-designated location, "calling extension: cell phone" as calling communication terminal information, "called extension: none" as called communication terminal information, "presence: away" as presence information and "setting for transfer: setting for out (090-1111-XXXX)" as transfer destination information are registered in association with "no location designation" as designated location information. A description of other profile information will be omitted.

The mobile terminal 10 of the user A acquires location information of the mobile terminal 10 at constant time intervals or at any preset timing (step S1 in FIG. 13). In a case where profile information including designated location information judged to coincide with the acquired location information exists, the mobile terminal 10 reads out the profile information (step S2 in FIG. 13, No at step S3). Then, in a case where the newly read-out profile information has changed from previously read-out profile information (Yes at step S5 in FIG. 13), the mobile terminal 10 adds user identification information of the user A to the newly read-out profile information and transmits to the connection control server 20 (step S6 in FIG. 13).

Meanwhile, in a case where profile information including designated location information judged to coincide with the acquired location information does not exist (Yes at step S3 in FIG. 13), the mobile terminal 10 reads out profile information of no location designation, namely profile information corresponding to a case where the mobile terminal 10 of the user A is "in motion" (step S4 in FIG. 13). Then, in a case where the newly read-out profile information has changed from previously read-out profile information (Yes at step S5 in FIG. 13), the mobile terminal 10 adds user identification information of the user A to the newly read-out profile information and transmits to the connection control server 20 (step S6 in FIG. 13) in the same manner as described above.

The connection control server 20 that the profile information is transmitted from the mobile terminal 10 as described above receives the profile information (step S11 in FIG. 14), and specifies a user from the user identification information transmitted together with the profile information (step S12 in FIG. 14). The connection control server 20 updates by registering the received profile information into the user information storing part 23 in association with the user information of the specified user (step S13 in FIG. 14). Moreover, the connection control server 20 updates presence information of the specified user managed by the presence server 28 to the presence information contained in the received profile information (step S13 in FIG. 14).

As a result that the mobile terminal 10 operates as described above, profile information corresponding to the current location of the user A operating the mobile terminal 10 is registered as the newest user information into the connection control server 20.

Figure 9:
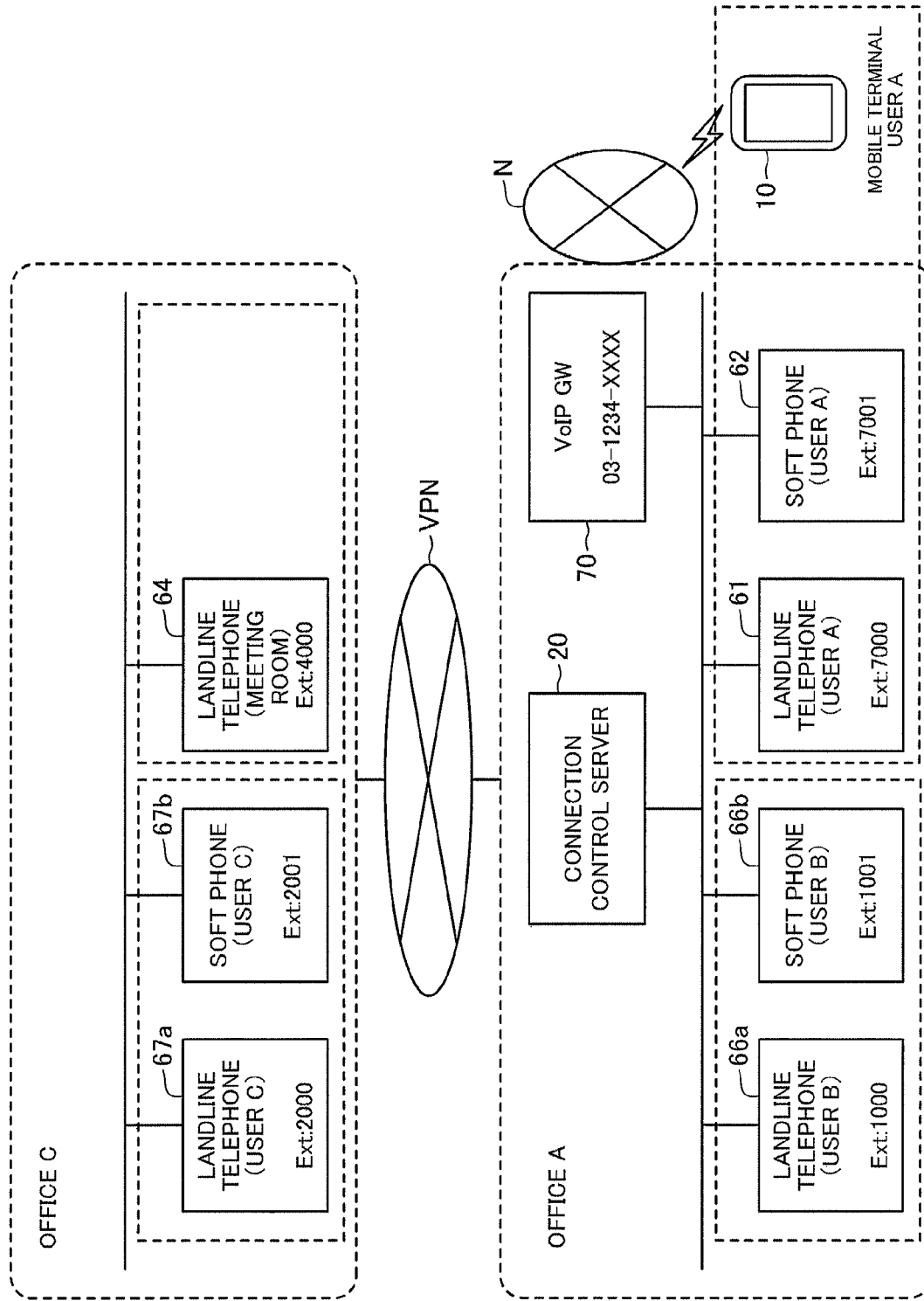
FIG. 9 is a diagram showing a specific configuration example of the communication system disclosed in FIG. 1.
Figure 10:
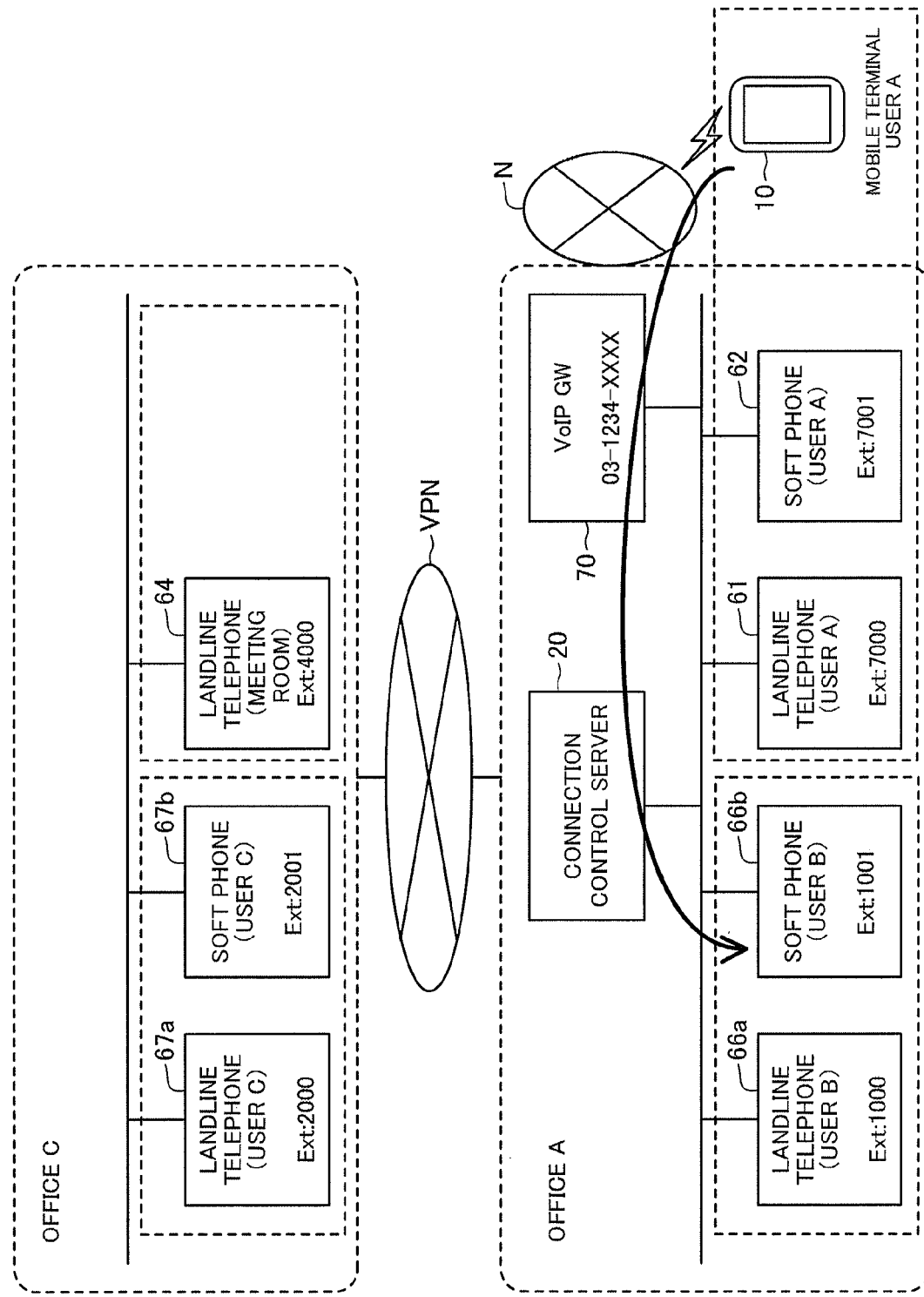
FIG. 10 is a diagram showing an example of an operation in the specific configuration of the communication system disclosed in FIG. 9.
Figure 11:
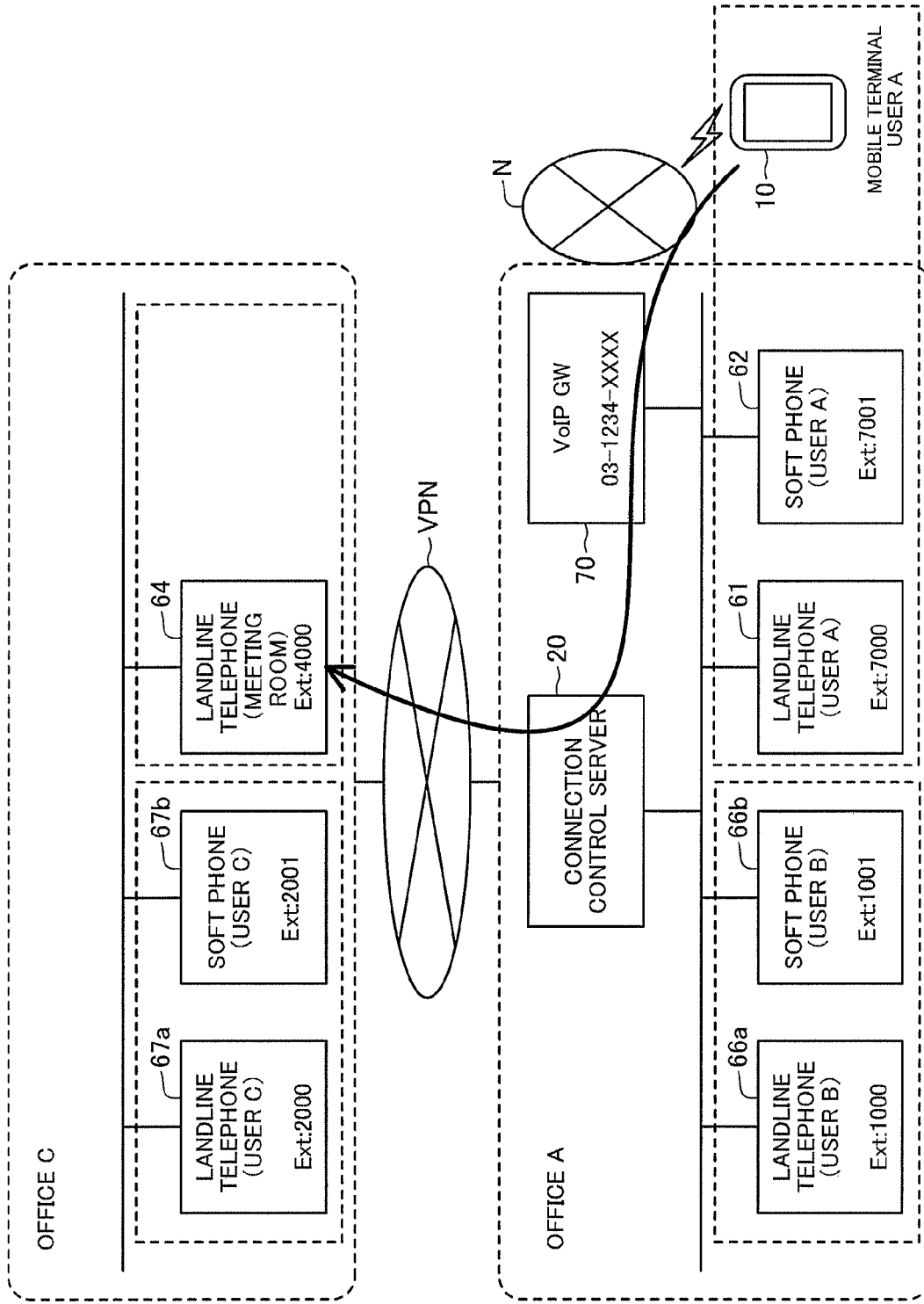
FIG. 11 is a diagram showing an operation example in the specific configuration of the communication system disclosed in FIG. 9.

Next, as shown in FIGS. 9 to 11 as shown in FIGS. 9 to 11, cases where the user A originates a call for other users in the respective offices while the mobile terminal 10 of the user A is outside the office A, namely while the user A is in motion, will be described.

First, in FIG. 10, it is assumed that a user B is in the office A and profile information corresponding to the office A of the user B is registered in the connection control server 20. Further, it is assumed that, in the profile information corresponding to the office A of the user B, a called communication terminal of the user B is set to a soft phone denoted by reference numeral 66b.

In such circumstances, the user A searches the address book in the mobile terminal 10 and selects address information of the user B of a destination user. Then, the user A designates the address information of the user B and inputs a call origination request in which the user B is the destination user. Thus, the mobile terminal 10 transmits, for example, call origination request information including destination user specification information (03-1234-XXXX, 1000) that is for specifying the user B and is composed of the company telephone number (03-1234-XXXX) of the user B and the extension number (1000) of the landline telephone, to the connection control server 20. In this case, the mobile terminal 10 adds user identification information for identifying the user A of a call source to the destination user specification information, and transmits to the connection control server 20. The destination user specification information for specifying the user B may be information that an identification number such as an employee number unique to the user B is added to the company telephone number (03-1234-XXXX) or may be other information.

The connection control server 20 receives the call origination request information transmitted from the mobile terminal 10 of the user A, via a VoIP GW (Voice over Internet Protocol Gateway) 70 set up in the office A (step S21 in FIG. 15). Then, the connection control server 20 first specifies that the call source is the user A from the user identification information of the user A added to the call origination request information. Moreover, the connection control server 20 specifies that the call destination is the user B from the call destination user specification information included in the call origination request information. Then, the connection control server 20 reads out user information including profile information of the user A of the specified call source and user information including profile information of the user B of the specified call destination, from the user information storing part 23 (step S22 in FIG. 15).

Subsequently, the connection control server 20 specifies that calling communication device information is "cell phone" from the profile information of the user A of the call source. Moreover, the connection control server 20 specifies that called communication device information is "soft phone 66b: extension 1001" within "office A" from the profile information of the user B of the call destination (step S23 in FIG. 15). Then, the connection control server performs connection control so that a call is originated from the mobile terminal 10 of the user A of the call source to the soft phone 66b of the user B of the call destination as shown by an arrow in FIG. 10 (step S24 in FIG. 15). Thus, the user A uses the mobile terminal 10 and the user B uses the soft phone 66b, whereby the users can communicate with each other.

Next, a different case from the above case will be described, where the user B is in the office C as shown in FIG. 11 and profile information corresponding to the office C is registered in the connection control server 20. It is assumed that, in the profile information corresponding to the office C of the user B, the called communication terminal of the user B is set to a landline telephone (meeting room) denoted by reference numeral 64.

In such circumstances, an operation when the user A originates a call for the user B is the same as the abovementioned operation. That is, the user A searches the address book in the mobile terminal 10, selects address information of the user B of a call destination user, designates the address information of the user B, and inputs a call origination request in which the user B is the call destination user. Then, the mobile terminal 10 transmits call origination request information including call destination user specification information specifying the user B, to the connection control server 20.

Then, the connection control server 20 having received the call origination request information transmitted from the mobile terminal 10 of the user A reads out profile information of the user A of the call source and profile information of the user B of the call destination, from the user information storing part 23 in the same manner as described above. Subsequently, the connection control server 20 specifies that calling communication device information is "cell phone" from the profile information of the user A of the call source. Moreover, the connection control server 20 specifies that called communication device information is "landline telephone (meeting room) 64: extension 4000" in "office C," from the profile information of the user B of the call destination. Then, the connection control server performs connection control so that a call is originated from the mobile terminal 10 of the user A of the call source to the landline telephone (meeting room) 64 in the office C where the user B of the call destination is located as shown by an arrow in FIG. 11. Thus, the user A uses the mobile terminal 10 and the user B uses the landline telephone (meeting room) 64 in the meeting room, whereby the users can communicate with each other.

In the abovementioned manner, the user A can originate a call by using the mobile terminal 10 that the user A can use outside, and the user B can receive a call by using the soft phone 66*b* in the office A or the landline telephone (meeting room) 64 in the office C depending on the location of the user B. In this case, neither the user A nor the user B needs to perform an operation of registering a communication device to use in accordance with his/her own movement, and preset information is automatically registered into the connection control server 20 and connection control is performed, so that it is possible to achieve increase of convenience for the user in use of a communication device.

In a case where "transfer destination" is set in profile information of a call destination user, the connection control server 20 performs connection control so as to transfer an incoming call to a transfer destination address (a telephone number, or the like). In this case, even if "called communication device information" is set in the profile information of the call destination user as mentioned above, the connection control server 20 performs connection control so that a communication device set in the called communication device information receives a call, and simultaneously, transfers the incoming call to the transfer destination communication device.

Figure 12:
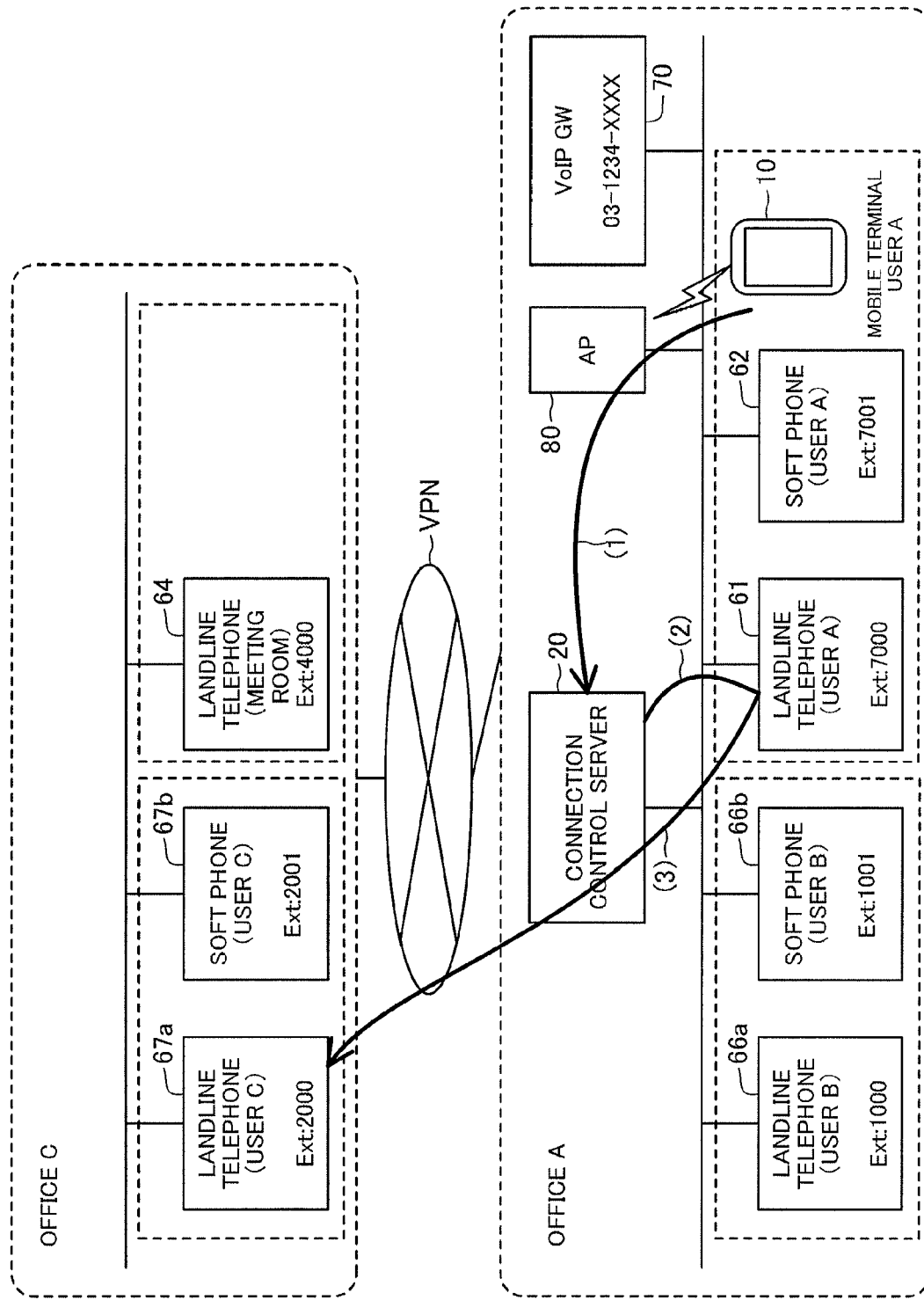
FIG. 12 is a diagram showing an operation example in the specific configuration of the communication system disclosed in FIG. 9.

Another different case from the above cases will be described, where the user A is in the office A as shown in FIG. 12 and profile information corresponding to the office A of the user A is registered in the connection control server 20. It is assumed that the profile information corresponding to the office A of the user A is registered and a calling communication device is set to a landline telephone denoted by reference numeral 61. Moreover, it is assumed that a user C of a call destination for the user A is located in the office C, profile information corresponding to the office C of the user C is registered and a called communication device is set to a landline telephone denoted by reference numeral 67*a*.

Also in such circumstances, an operation when the user A originates a call is the same as described above. That is, the user A searches the address book in the mobile terminal 10, selects address information of the user C as the call destination user, designates the address information of the user C, and inputs a call origination request with the user C as the call destination user. Then, as shown by an arrow (1) in FIG. 12, the mobile terminal 10 transmits call origination request information including call destination user specification information specifying the user C, to the connection control server 20 via an AP (Access Point) 80 set up in the office A connected through wireless communication.

Then, the connection control server 20 having received the call origination request information transmitted from the mobile terminal 10 of the user A reads out the profile information of the user A of the call source and the profile information of the user C of the call destination, from the user information storing part 23 in the same manner as described above. Subsequently, the connection control server 20 specifies that calling communication device information is "landline telephone: extension 7000" from the profile information of the user A of the call source. Moreover, the connection control server 20 specifies that called communication device information is "landline telephone 67*a*: extension 2000" in "office C" from the profile information of the user C of the call destination.

Then, as shown by arrows (2) and (3) in FIG. 12, the connection control server performs connection control so that a call is originated from the landline telephone 61 in the office A that the user A of the call source can use to the landline telephone 67*a* in the office C where the user C of the call destination is located. Thus, the user A uses the landline telephone 61 set up in the office A, and the user C uses the landline telephone 67*a* in the office C, whereby the users can communicate with each other.

In the above manner, the user A can originate a call by using the landline telephone 61 that the user A can use in the office A where the user A is located, and the user C can receive the call by using the landline telephone 67*a* in the office C where the user C is located. Specifically, the user A can make a call origination request by using the address book registered in the mobile terminal 10 operated by him/her and also originate a call by using the landline telephone 61 that is another communication device. In this case, neither the user A nor the user C needs to perform an operation of registering a communication device to use in accordance with the his/her own movement, and preset information is automatically registered and connection control is performed, so that it is possible to achieve increase of convenience for the user in use of a communication device.

<Supplementary Notes>

Figure 16:
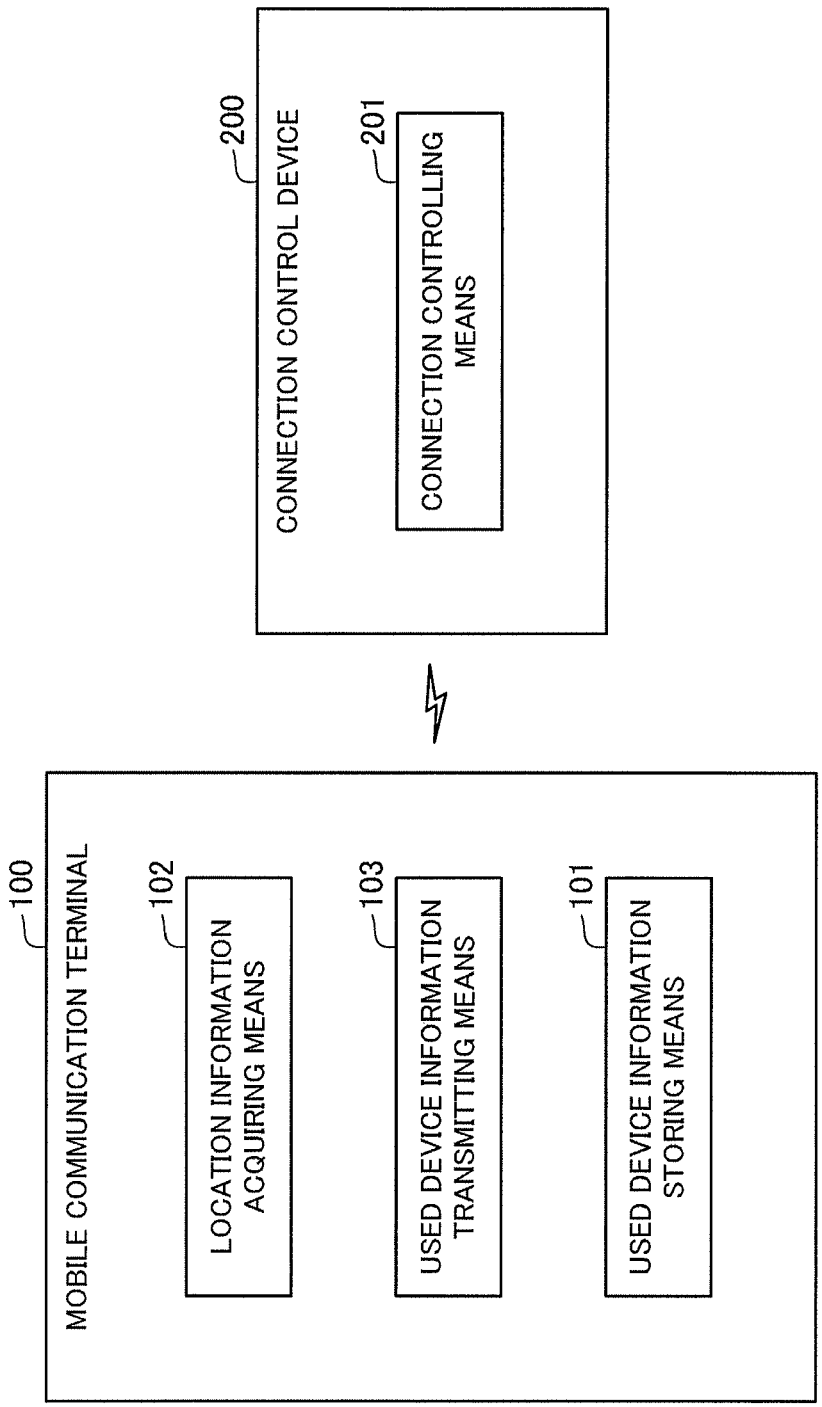
FIG. 16 is a block diagram showing the configuration of a communication system according to Supplementary Note 1 of the present invention.

The whole or part of the exemplary embodiments disclosed above can be described as the following supplementary notes. Below, the outline of the configurations of a communication system (see FIG. 16), a mobile communication terminal, a connection control device, a program and a communication control method according to the present invention will be described. However, the present invention is not limited to the following configurations.

(Supplementary Note 1)

A communication system comprising:

a connection control device 200 performing connection control between given communication devices; and a mobile communication terminal 100 capable of communicating with the connection control device, wherein the mobile communication terminal 100 includes:

a used device information storing means 101 for previously associating and storing designated location information designating a given location and used device information specifying a communication device to be used depending on a location;

a location information acquiring means 102 for acquiring location information representing a location of the terminal itself; and a used device information transmitting means 103 for transmitting the used device information associated with the designated location information corresponding to the location information acquired by the location information acquiring means, to the connection control device; and wherein the connection control device 200 includes a connection controlling means 201 for considering a communication device corresponding to the used device information transmitted from the mobile communication terminal as a communication device to be used by a user operating the mobile communication terminal having transmitted the used device information, and performing connection control of the communication device.

(Supplementary Note 2)

The communication system according to Supplementary Note 1, wherein:

the used device information transmitting means included by the mobile communication terminal is configured to transmit the used device information containing calling device information specifying a communication device to be used for originating a call, to the connection control device; and the connection controlling means included by the connection control device is configured to, in response to a call origination request from a user operating the mobile communication terminal having transmitted the used device information, consider a communication device corresponding to the calling device information contained by the used device information as a calling-side communication device and perform connection control.

(Supplementary Note 3)

The communication system according to Supplementary Note 2, wherein:

the mobile communication terminal includes a call origination requesting means for transmitting call origination request information representing a request for origination of a call for a call destination user, to the connection control device; and the connection controlling means included by the connection control device is configured to, in response to the call origination request information transmitted from the mobile communication terminal, consider a communication device corresponding to the calling device information contained by the used device information transmitted from the mobile communication terminal having transmitted the call origination request information, as a calling-side communication device, and perform connection control so that a call is originated from the calling-side communication device to the call destination user.

(Supplementary Note 4)

The communication system according to Supplementary Note 3, wherein:

the mobile communication terminal includes a call destination user information storing means for storing call destination user specification information specifying a call destination user;

the call origination requesting means included by the mobile communication terminal is configured to transmit the call origination request information that the call destination user specification information stored by the call destination user information storing means is contained, to the connection control device; and the connection controlling means included by the connection control device is configured to perform connection control so that a call is originated to the call destination user specified by the call destination user specification information contained by the call origination request information transmitted from the mobile communication terminal.

(Supplementary Note 5)

The communication system according to any of Supplementary Notes 1 to 4, wherein:

the used device information transmitting means included by the mobile communication terminal is configured to transmit the used device information containing called device information specifying a communication device to be used for receiving a call, to the connection control device; and the connection controlling means included by the connection control device is configured to, in response to a request for origination of a call for a user operating the mobile communication terminal having transmitted the used device information, consider a communication device corresponding to the called device information contained by the used device information, as a called-side communication device, and perform connection control.

(Supplementary Note 6)

The communication system according to any of Supplementary Notes 1 to 5, wherein:

the used device information transmitting means included by the mobile communication terminal is configured to, when there is a change in the location information acquired by the location information acquiring means, transmit the used device information associated with the designated location information corresponding to the location information, to the connection control device; and the connection controlling means included by the connection control device is configured to consider a communication terminal corresponding to newest one of the used device information having transmitted from the mobile communication terminal, as a communication terminal to be used by a user operating the mobile communication terminal having transmitted the used device information, and perform connection control of the communication device.

(Supplementary Note 7)

The communication system according to any of Supplementary Notes 1 to 6, wherein:

the used device information storing means included by the mobile communication terminal is configured to store information that the designated location information of no location designation and the used device information are previously associated; and the used device information transmitting means included by the mobile communication terminal is configured to, in a case where the designated location information corresponding to the location information acquired by the location information acquiring means is not stored within the used device information storing means, transmit the used device information associated with the designated location information of no location designation, to the connection control device.

(Supplementary Note 8)

The communication system according to any of Supplementary Notes 1 to 7, wherein:

the used device information storing means included by the mobile communication terminal is configured to previously associate and store the designated location information and transfer destination information specifying a communication device of a transfer destination when a call is received;

the used device information transmitting means included by the mobile communication terminal is configured to transmit the transfer destination information associated with the designated location information corresponding to the location information acquired by the location information acquiring means, to the connection control device; and the connection controlling means included by the connection control device is configured to, in response to a request for origination of a call for a user operating the mobile communication terminal having transmitted the transfer destination information, transfer an incoming call relating to the call origination request to a communication device specified by the transfer destination information.

(Supplementary Note 9)

The communication system according to any of Supplementary Notes 1 to 8, wherein:

the used device information storing means included by the mobile communication terminal is configured to previously associate and store the designated location information and user status information representing a status of a user;

the used device information transmitting means included by the mobile communication terminal is configured to transmit the user statues information associated with the designated location information corresponding to the location information acquired by the location information acquiring means, to the connection control device; and the connection controlling means included by the connection control device is configured to register the user status information as information representing a status of a user operating the mobile communication terminal having transmitted the user status information, into preset presence data.

(Supplementary Note 10)

A mobile communication terminal capable of communicating with a connection control device performing connection control between given communication devices, the mobile communication terminal comprising:

a used device information storing means for previously associating and storing designated location information designating a given location and used device information specifying a communication device to be used depending on a location;

a location information acquiring means for acquiring location information representing a location of the terminal itself; and a used device information transmitting means for transmitting the used device information associated with the designated location information corresponding to the location information acquired by the location information acquiring means, to the connection control device, wherein the used device information transmitting means is configured to transmit the used device information to the connection control device so that a communication device corresponding to the used device information is, as a communication device to be used by a user operating the terminal itself, subjected to connection control by the connection control device.

(Supplementary Note 11)

The mobile communication terminal according to Supplementary Note 10, wherein:

the used device information transmitting means is configured to transmit, to the connection control device, the used device information containing calling device information specifying a communication device to be used for originating a call so that, in response to a call origination request from a user operating the terminal itself, a communication device corresponding to the calling device information contained by the used device information is, as a calling-side communication device, subjected to connection control by the connection control device.

(Supplementary Note 12)

A computer program comprising instructions for causing a mobile communication terminal, which is capable of communicating with a connection control device performing connection control between given communication devices and which includes a used device information storing means for previously associating and storing designated location information designating a given location and used device information specifying a communication device to be used depending on a location, to realize:

a location information acquiring means for acquiring location information representing a location of the terminal itself; and a used device information transmitting means for transmitting the used device information associated with the designated location information corresponding to the location information acquired by the location information acquiring means, to the connection control device, the computer program also comprising instructions for realizing that the used device information transmitting means is configured to transmit the used device information to the connection control device so that a communication device corresponding to the used device information is, as a communication device to be used by a user operating the terminal itself, subjected to connection control by the connection control device.

(Supplementary Note 13)

The computer program according to Supplementary Note 12, wherein the used device information transmitting means is configured to transmit, to the connection control device, the used device information containing calling device information specifying a communication device to be used for originating a call so that, in response to a call origination request from a user operating the terminal itself, a communication device corresponding to the calling device information contained by the used device information is, as a calling-side communication device, subjected to connection control by the connection control device.

(Supplementary Note 14)

A connection control device performing connection control between given communication devices, the connection control device comprising a connection controlling means for: receiving used device information from a mobile communication terminal capable of communicating, the used device information corresponding to location information of the mobile communication terminal acquired by the mobile communication terminal and being previously stored in the mobile communication terminal, and the used device information specifying a communication device to be used depending on a location; considering a communication device corresponding to the received used device information as a communication device to be used by a user operating the mobile communication terminal having transmitted the used device information; and performing connection control of the communication device.

(Supplementary Note 15)

The connection control device according to Supplementary Note 14, wherein the connection controlling means is configured to, in response to a call origination request from a user operating the mobile communication terminal having transmitted the used device information, consider a communication device corresponding to calling device information as a calling-side communication device and perform connection control, the calling device information being contained by the used device information and specifying a communication device to be used for originating a call.

(Supplementary Note 16)

A computer program comprising instructions for causing a connection control device, which performs connection control between given communication devices, to realize a connection controlling means for: receiving used device information from a mobile communication terminal capable of communicating, the used device information corresponding to location information of the mobile communication terminal acquired by the mobile communication terminal and being previously stored in the mobile communication terminal, and the used device information specifying a communication device to be used depending on a location; considering a communication device corresponding to the received used device information as a communication device to be used by a user operating the mobile communication terminal having transmitted the used device information; and performing connection control of the communication device.

(Supplementary Note 17)

The computer program according to Supplementary Note 16, wherein the connection controlling means is configured to: in response to a call origination request from a user operating the mobile communication terminal having transmitted the used device information, consider a communication device corresponding to calling device information as a calling-side communication device and perform connection control, the calling device information being contained by the used device information and specifying a communication device to be used for originating a call.

(Supplementary Note 18)

A communication control method for communication control by a communication system including a connection control device performing connection control between given communication devices and a mobile communication terminal capable of communicating with the connection control device, the communication control method comprising:

by the mobile communication terminal, acquiring location information representing a location of the terminal itself, and based on previously associated and stored designated location information and used device information, transmitting the used device information associated with the designated location information corresponding to the acquired location information to the connection control device, the designated location information designating a given location, and the used device information specifying a communication device to be used depending on a location; and by the connection control device, considering a communication device corresponding to the used device information transmitted from the mobile communication terminal as a communication device to be used by a user operating the mobile communication terminal having transmitted the used device information, and performing connection control of the communication device.

(Supplementary Note 19)

The communication control method according to Supplementary Note 18, comprising:

by the mobile communication terminal, transmitting the used device information containing calling device information specifying a communication device to be used for originating a call, to the connection control device; and by the connection control device, in response to a call origination request from a user operating the mobile communication terminal having transmitted the used device information, considering a communication device corresponding to the calling device information contained by the used device information as a calling-side communication device, and performing connection control.

(Supplementary Note 20)

A communication control method for communication control by a mobile communication terminal capable of communicating with a connection control device performing connection control between given communication devices, the communication control method comprising:

acquiring location information representing a location of the terminal itself; and based on previously associated and stored designated location information and used device information, transmitting the used device information associated with the designated location information corresponding to the acquired location information to the connection control device, and also transmitting the used device information to the connection control device so that a communication device corresponding to the used device information is, as a communication device to be used by a user operating the terminal itself, subjected to connection control by the connection control device, the designated location information designating a given location, and the used device information specifying a communication device to be used depending on a location.

(Supplementary Note 21)

The communication control method according to Supplementary Note 20, comprising:

transmitting the used device information containing calling device information specifying a communication device to be used for originating a call to the connection control device so that, in response to a call origination request from a user operating the terminal itself, a communication device corresponding to the calling device information contained by the used device information is, as a calling-side communication device, subjected to connection control by the connection control device.

(Supplementary Note 22)

A communication control method for communication control by a connection control device performing connection control between given communication devices, the communication control method comprising:

receiving used device information from a mobile communication terminal capable of communicating, the used device information corresponding to location information of the mobile communication terminal acquired by the mobile communication terminal and being previously stored in the mobile communication terminal, and the used device information specifying a communication device to be used depending on a location;

considering a communication device corresponding to the received used device information as a communication device to be used by a user operating the mobile communication terminal having transmitted the used device information; and performing connection control of the communication device.

(Supplementary Note 23)

The communication control method according to Supplementary Note 22, comprising:

in response to a call origination request from a user operating the mobile communication terminal having transmitted the used device information, considering a communication device corresponding to calling device information as a calling-side communication device and performing connection control, the calling device information being contained by the used device information and specifying a communication device to be used for originating a call.

The abovementioned program is stored in a storage device or recorded on a computer-readable recording medium. For example, the recording medium is a portable medium such as a flexible disk, an optical disk, a magneto-optical disk and a semiconductor memory.

Although the present invention is described above referring to the exemplary embodiment and so on, the present invention is not limited to the exemplary embodiment described above. The configurations and details of the present invention can be changed and modified in various manners that can be understood by one skilled in the art.

The present invention is based upon and claims the benefit of priority from Japanese patent application No. 2012-073349, filed on Mar. 28, 2012, the disclosure of which is incorporated herein in its entirety by reference.

DESCRIPTION OF REFERENCE NUMERALS 10 mobile terminal
11 profile information inputting part
12 location information acquiring part
13 profile information transmitting part
14 outgoing call processing part
15 incoming call processing part
16 profile information storing part
16a profile information
17 address book storing part
17a address information
20 connection control server
21 profile information registering part
22 connection control processing part
23 user information storing part
23a user information
28 presence server
30, 40, 50 communication device
100 mobile communication device
101 used device information transmitting means
102 location information acquiring means
103 used device information transmitting means
200 connection control device
201 connection controlling means

The invention claimed is:

1. A communication system comprising:
a connection control device performing connection control between given communication devices; and
a mobile communication terminal capable of communicating with the connection control device,
wherein the mobile communication terminal includes:
a used device information storing unit for previously associating and storing designated location information designating a given location and used device information specifying a communication device to be used depending on a location;
a location information acquiring unit for acquiring location information representing a location of the terminal itself; and
a used device information transmitting unit for transmitting the used device information associated with the designated location information corresponding to the location information acquired by the location information acquiring unit, to the connection control device; and
wherein the connection control device includes a connection controlling unit for considering a communication device corresponding to the used device information transmitted from the mobile communication terminal as a communication device to be used by a user operating the mobile communication terminal having transmitted the used device information, and performing connection control of the communication device,
wherein the used device information transmitting unit included by the mobile communication terminal is configured to transmit the used device information containing calling device information specifying a communication device to be used for originating a call, to the connection control device,
wherein the mobile communication terminal includes a call origination requesting unit for transmitting call origination request information representing a request for origination of a call for a call destination user, to the connection control device,
wherein the connection controlling unit included by the connection control device is configured to, in response to a call origination request from a user operating the mobile communication terminal having transmitted the used device information, consider a communication device corresponding to the calling device information contained by the used device information as a calling-side communication device and perform connection control, and
wherein the connection controlling unit included by the connection control device is configured to, in response to the call origination request information transmitted from the mobile communication terminal, consider a communication device corresponding to the calling device information contained by the used device information transmitted from the mobile communication terminal having transmitted the call origination request information, as a calling-side communication device, and perform connection control so that a call is originated from the calling-side communication device to the call destination user.

2. The communication system according to claim 1, wherein:
the mobile communication terminal includes a call destination user information storing unit for storing call destination user specification information specifying a call destination user;
the call origination requesting unit included by the mobile communication terminal is configured to transmit the call origination request information that the call destination user specification information stored by the call destination user information storing unit is contained, to the connection control device; and
the connection controlling unit included by the connection control device is configured to perform connection control so that a call is originated to the call destination user specified by the call destination user specification information contained by the call origination request information transmitted from the mobile communication terminal.

3. A communication system comprising:
a connection control device performing connection control between given communication devices; and
a mobile communication terminal capable of communicating with the connection control device,
wherein the mobile communication terminal includes:
a used device information storing unit for previously associating and storing designated location information designating a given location and used device information specifying a communication device to be used depending on a location;
a location information acquiring unit for acquiring location information representing a location of the terminal itself; and
a used device information transmitting unit for transmitting the used device information associated with the designated location information corresponding to the location information acquired by the location information acquiring unit, to the connection control device; and wherein the connection control device includes a connection controlling unit for considering a communication device corresponding to the used device information transmitted from the mobile communication terminal as a communication device to be used by a user operating the mobile communication terminal having transmitted the used device information, and performing connection control of the communication device, wherein the used device information transmitting unit included by the mobile communication terminal is configured to transmit the used device information containing called device information specifying a communication device to be used for receiving a call, to the connection control device; and the connection controlling unit included by the connection control device is configured to, in response to a request for origination of a call for a user operating the mobile communication terminal having transmitted the used device information, consider a communication device corresponding to the called device information contained by the used device information, as a called-side communication device, and perform connection control.

4. A communication system comprising:
a connection control device performing connection control between given communication devices; and
a mobile communication terminal capable of communicating with the connection control device,
wherein the mobile communication terminal includes:
  a used device information storing unit for previously associating and storing designated location information designating a given location and used device information specifying a communication device to be used depending on a location;
  a location information acquiring unit for acquiring location information representing a location of the terminal itself; and
  a used device information transmitting unit for transmitting the used device information associated with the designated location information corresponding to the location information acquired by the location information acquiring unit, to the connection control device; and
wherein the connection control device includes a connection controlling unit for considering a communication device corresponding to the used device information transmitted from the mobile communication terminal as a communication device to be used by a user operating the mobile communication terminal having transmitted the used device information, and performing connection control of the communication device,
wherein the used device information transmitting unit included by the mobile communication terminal is configured to, when there is a change in the location information acquired by the location information acquiring unit, transmit the used device information associated with the designated location information corresponding to the location information, to the connection control device; and
the connection controlling unit included by the connection control device is configured to consider a communication terminal corresponding to newest one of the used device information having transmitted from the mobile communication terminal, as a communication terminal to be used by a user operating the mobile communication terminal having transmitted the used device information, and perform connection control of the communication device.

5. A communication system comprising:
a connection control device performing connection control between given communication devices; and
a mobile communication terminal capable of communicating with the connection control device,
wherein the mobile communication terminal includes:
  a used device information storing unit for previously associating and storing designated location information designating a given location and used device information specifying a communication device to be used depending on a location;
  a location information acquiring unit for acquiring location information representing a location of the terminal itself; and
  a used device information transmitting unit for transmitting the used device information associated with the designated location information corresponding to the location information acquired by the location information acquiring unit, to the connection control device; and
wherein the connection control device includes a connection controlling unit for considering a communication device corresponding to the used device information transmitted from the mobile communication terminal as a communication device to be used by a user operating the mobile communication terminal having transmitted the used device information, and performing connection control of the communication device,
wherein the used device information storing unit included by the mobile communication terminal is configured to store information that the designated location information of no location designation and the used device information are previously associated; and
the used device information transmitting unit included by the mobile communication terminal is configured to, in a case where the designated location information corresponding to the location information acquired by the location information acquiring unit is not stored within the used device information storing unit, transmit the used device information associated with the designated location information of no location designation, to the connection control device.

6. A communication system comprising:
a connection control device performing connection control between given communication devices; and
a mobile communication terminal capable of communicating with the connection control device,
wherein the mobile communication terminal includes:
  a used device information storing unit for previously associating and storing designated location information designating a given location and used device information specifying a communication device to be used depending on a location;
  a location information acquiring unit for acquiring location information representing a location of the terminal itself; and
  a used device information transmitting unit for transmitting the used device information associated with the designated location information corresponding to the location information acquired by the location information acquiring unit, to the connection control device; and
wherein the connection control device includes a connection controlling unit for considering a communication device corresponding to the used device information transmitted from the mobile communication terminal as a communication device to be used by a user operating the mobile communication terminal having transmitted the used device information, and performing connection control of the communication device, wherein the used device information storing unit included by the mobile communication terminal is configured to previously associate and store the designated location information and transfer destination information specifying a communication device of a transfer destination when a call is received;

the used device information transmitting unit included by the mobile communication terminal is configured to transmit the transfer destination information associated with the designated location information corresponding to the location information acquired by the location information acquiring unit, to the connection control device; and the connection controlling unit included by the connection control device is configured to, in response to a request for origination of a call for a user operating the mobile communication terminal having transmitted the transfer destination information, transfer an incoming call relating to the call origination request to a communication device specified by the transfer destination information.

7. A communication system comprising:

a connection control device performing connection control between given communication devices; and a mobile communication terminal capable of communicating with the connection control device, wherein the mobile communication terminal includes:
  a used device information storing unit for previously associating and storing designated location information designating a given location and used device information specifying a communication device to be used depending on a location;
  a location information acquiring unit for acquiring location information representing a location of the terminal itself; and
  a used device information transmitting unit for transmitting the used device information associated with the designated location information corresponding to the location information acquired by the location information acquiring unit, to the connection control device; and wherein the connection control device includes a connection controlling unit for considering a communication device corresponding to the used device information transmitted from the mobile communication terminal as a communication device to be used by a user operating the mobile communication terminal having transmitted the used device information, and performing connection control of the communication device, wherein the used device information storing unit included by the mobile communication terminal is configured to previously associate and store the designated location information and user status information representing a status of a user;

the used device information transmitting unit included by the mobile communication terminal is configured to transmit the user status information associated with the designated location information corresponding to the location information acquired by the location information acquiring unit, to the connection control device; and the connection controlling unit included by the connection control device is configured to register the user status information as information representing a status of a user operating the mobile communication terminal having transmitted the user status information, into preset presence data.

8. A mobile communication terminal capable of communicating with a connection control device performing connection control between given communication devices, the mobile communication terminal comprising:

a used device information storing unit for previously associating and storing designated location information designating a given location and used device information specifying a communication device to be used depending on a location;

a location information acquiring unit for acquiring location information representing a location of the terminal itself; and a used device information transmitting unit for transmitting the used device information associated with the designated location information corresponding to the location information acquired by the location information acquiring unit, to the connection control device, wherein the used device information transmitting unit is configured to transmit the used device information to the connection control device so that a communication device corresponding to the used device information is, as a communication device to be used by a user operating the terminal itself, subjected to connection control by the connection control device, wherein the used device information transmitting unit included by the mobile communication terminal is configured to transmit the used device information containing calling device information specifying a communication device to be used for originating a call, to the connection control device, wherein the mobile communication terminal includes a call origination requesting unit for transmitting call origination request information representing a request for origination of a call for a call destination user, to the connection control device, wherein a connection controlling unit included by the connection control device is configured to, in response to a call origination request from a user operating the mobile communication terminal having transmitted the used device information, consider a communication device corresponding to the calling device information contained by the used device information as a calling-side communication device and perform connection control, and wherein the connection controlling unit included by the connection control device is configured to, in response to the call origination request information transmitted from the mobile communication terminal, consider a communication device corresponding to the calling device information contained by the used device information transmitted from the mobile communication terminal having transmitted the call origination request information, as a calling-side communication device, and perform connection control so that a call is originated from the calling-side communication device to the call destination user.

9. The mobile communication terminal according to claim 8, wherein:

the used device information transmitting unit is configured to transmit, to the connection control device, the used device information containing calling device information specifying a communication device to be used for originating a call so that, in response to a call origination request from a user operating the terminal itself, a communication device corresponding to the calling device information contained by the used device information is, as a calling-side communication device, subjected to connection control by the connection control device.

10. A non-transitory computer-readable medium storing a computer program, the computer program comprising instructions for causing a mobile communication terminal, which is capable of communicating with a connection control device performing connection control between given communication devices and which includes a used device information storing unit for previously associating and storing designated location information designating a given location and used device information specifying a communication device to be used depending on a location, to realize:
- a location information acquiring unit for acquiring location information representing a location of the terminal itself; and
- a used device information transmitting unit for transmitting the used device information associated with the designated location information corresponding to the location information acquired by the location information acquiring unit, to the connection control device,
- the computer program also comprising instructions for realizing that the used device information transmitting unit is configured to transmit the used device information to the connection control device so that a communication device corresponding to the used device information is, as a communication device to be used by a user operating the terminal itself, subjected to connection control by the connection control device
- wherein the used device information transmitting unit included by the mobile communication terminal is configured to transmit the used device information containing calling device information specifying a communication device to be used for originating a call, to the connection control device,
- wherein the mobile communication terminal includes a call origination requesting unit for transmitting call origination request information representing a request for origination of a call for a call destination user, to the connection control device,
- wherein a connection controlling unit included by the connection control device is configured to, in response to a call origination request from a user operating the mobile communication terminal having transmitted the used device information, consider a communication device corresponding to the calling device information contained by the used device information as a calling-side communication device and perform connection control, and wherein the connection controlling unit included by the connection control device is configured to, in response to the call origination request information transmitted from the mobile communication terminal, consider a communication device corresponding to the calling device information contained by the used device information transmitted from the mobile communication terminal having transmitted the call origination request information, as a calling-side communication device, and perform connection control so that a call is originated from the calling-side communication device to the call destination user.

11. The non-transitory computer-readable medium storing the computer program according to claim 10, wherein the used device information transmitting unit is configured to transmit, to the connection control device, the used device information containing calling device information specifying a communication device to be used for originating a call so that, in response to a call origination request from a user operating the terminal itself, a communication device corresponding to the calling device information contained by the used device information is, as a calling-side communication device, subjected to connection control by the connection control device.

12. A connection control device performing connection control between given communication devices, the connection control device comprising a connection controlling unit for: receiving used device information from a mobile communication terminal capable of communicating, the used device information corresponding to location information of the mobile communication terminal acquired by the mobile communication terminal and being previously stored in the mobile communication terminal, and the used device information specifying a communication device to be used depending on a location; considering a communication device corresponding to the received used device information as a communication device to be used by a user operating the mobile communication terminal having transmitted the used device information; and performing connection control of the communication device,
- wherein the mobile communication terminal includes:
  - a call origination requesting unit for transmitting call origination request information representing a request for origination of a call for a call destination user, to the connection control device, and
  - a used device information transmitting unit included by the mobile communication terminal is configured to transmit the used device information containing calling device information specifying a communication device to be used for originating a call, to the connection control device,
- wherein the connection controlling unit included by the connection control device is configured to, in response to a call origination request from a user operating the mobile communication terminal having transmitted the used device information, consider a communication device corresponding to the calling device information contained by the used device information as a calling-side communication device and perform connection control, and
- wherein the connection controlling unit included by the connection control device is configured to, in response to the call origination request information transmitted from the mobile communication terminal, consider a communication device corresponding to the calling device information contained by the used device information transmitted from the mobile communication terminal having transmitted the call origination request information, as a calling-side communication device, and perform connection control so that a call is originated from the calling-side communication device to the call destination user.

13. The connection control device according to claim 12, wherein the connection controlling unit is configured to, in response to a call origination request from a user operating the mobile communication terminal having transmitted the used device information, consider a communication device corresponding to calling device information as a calling-side communication device and perform connection control, the calling device information being contained by the used device information and specifying a communication device to be used for originating a call.

14. A non-transitory computer-readable medium storing a computer program, the computer program comprising instructions for causing a connection control device, which performs connection control between given communication devices, to realize a connection controlling unit for:
  receiving used device information from a mobile communication terminal capable of communicating, the used device information corresponding to location information of the mobile communication terminal acquired by the mobile communication terminal and being previously stored in the mobile communication terminal, and the used device information specifying a communication device to be used depending on a location;
  considering a communication device corresponding to the received used device information as a communication device to be used by a user operating the mobile communication terminal having transmitted the used device information; and
  performing connection control of the communication device,
wherein the mobile communication terminal includes:
  a call origination requesting unit for transmitting call origination request information representing a request for origination of a call for a call destination user, to the connection control device, and
  a used device information transmitting unit included by the mobile communication terminal is configured to transmit the used device information containing calling device information specifying a communication device to be used for originating a call, to the connection control device,
wherein the connection controlling unit included by the connection control device is configured to, in response to a call origination request from a user operating the mobile communication terminal having transmitted the used device information, consider a communication device corresponding to the calling device information contained by the used device information as a calling-side communication device and perform connection control, and
wherein the connection controlling unit included by the connection control device is configured to, in response to the call origination request information transmitted from the mobile communication terminal, consider a communication device corresponding to the calling device information contained by the used device information transmitted from the mobile communication terminal having transmitted the call origination request information, as a calling-side communication device, and perform connection control so that a call is originated from the calling-side communication device to the call destination user.

15. The non-transitory computer-readable medium storing the computer program according to claim 14, wherein the connection controlling unit is configured to: in response to a call origination request from a user operating the mobile communication terminal having transmitted the used device information, consider a communication device corresponding to calling device information as a calling-side communication device and perform connection control, the calling device information being contained by the used device information and specifying a communication device to be used for originating a call.

16. A communication control method for communication control by a communication system including a connection control device performing connection control between given communication devices and a mobile communication terminal capable of communicating with the connection control device, the communication control method comprising:
  by the mobile communication terminal,
    acquiring location information representing a location of the terminal itself,
    based on previously associated and stored designated location information and used device information, transmitting the used device information associated with the designated location information corresponding to the acquired location information to the connection control device, the designated location information designating a given location, and the used device information specifying a communication device to be used depending on a location,
    transmitting call origination request information representing a request for origination of a call for a call destination user, to the connection control device, and
    transmitting the used device information containing calling device information specifying a communication device to be used for originating a call, to the connection control device; and
  by the connection control device,
    considering a communication device corresponding to the used device information transmitted from the mobile communication terminal as a communication device to be used by a user operating the mobile communication terminal having transmitted the used device information,
    in response to a call origination request from a user operating the mobile communication terminal having transmitted the used device information, considering a communication device corresponding to the calling device information contained by the used device information as a calling-side communication device,
    in response to the call origination request information transmitted from the mobile communication terminal, considering a communication device corresponding to the calling device information contained by the used device information transmitted from the mobile communication terminal having transmitted the call origination request information, as a calling-side communication device, and
    performing connection control so that a call is originated from the calling-side communication device to the call destination user.

17. The communication control method according to claim 16, comprising:
  by the mobile communication terminal,
  transmitting the used device information containing calling device information specifying a communication device to be used for originating a call, to the connection control device; and
  by the connection control device,
  in response to a call origination request from a user operating the mobile communication terminal having transmitted the used device information, considering a communication device corresponding to the calling device information contained by the used device information as a calling-side communication device, and performing connection control.

18. A communication control method for communication control by a mobile communication terminal capable of communicating with a connection control device performing connection control between given communication devices, the communication control method comprising:
  acquiring location information representing a location of the terminal itself; and based on previously associated and stored designated location information and used device information, transmitting the used device information associated with the designated location information corresponding to the acquired location information to the connection control device, transmitting call origination request information representing a request for origination of a call for a call destination user, to the connection control device, and also transmitting the used device information to the connection control device so that a communication device corresponding to the used device information is, as a communication device to be used by a user operating the terminal itself, subjected to connection control by the connection control device, the designated location information designating a given location, and the used device information specifying a communication device to be used depending on a location, wherein the used device information transmitted to the connection control device also contains calling device information specifying a communication device to be used for originating a call, wherein the connection control device is configured to, in response to a call origination request from a user operating the mobile communication terminal having transmitted the used device information, consider a communication device corresponding to the calling device information contained by the used device information as a calling-side communication device and perform connection control, and wherein the connection control device is configured to, in response to the call origination request information transmitted from the mobile communication terminal, consider a communication device corresponding to the calling device information contained by the used device information transmitted from the mobile communication terminal having transmitted the call origination request information, as a calling-side communication device, and perform connection control so that a call is originated from the calling-side communication device to the call destination user.

19. The communication control method according to claim 18, comprising:

transmitting the used device information containing calling device information specifying a communication device to be used for originating a call to the connection control device so that, in response to a call origination request from a user operating the terminal itself, a communication device corresponding to the calling device information contained by the used device information is, as a calling-side communication device, subjected to connection control by the connection control device.

20. A communication control method for communication control by a connection control device performing connection control between given communication devices, the communication control method comprising:

receiving used device information from a mobile communication terminal capable of communicating, the used device information corresponding to location information of the mobile communication terminal acquired by the mobile communication terminal and being previously stored in the mobile communication terminal, and the used device information specifying a communication device to be used depending on a location;

receiving call origination request information representing a request for origination of a call for a call destination user, from the mobile communication terminal, wherein the used device information contains calling device information specifying a communication device to be used for originating a call, considering a communication device corresponding to the received used device information as a communication device to be used by a user operating the mobile communication terminal having transmitted the used device information;

in response to a call origination request from a user operating the mobile communication terminal having transmitted the used device information, considering a communication device corresponding to the calling device information contained by the used device information as a calling-side communication device, in response to the call origination request information transmitted from the mobile communication terminal, considering a communication device corresponding to the calling device information contained by the used device information transmitted from the mobile communication terminal having transmitted the call origination request information, as a calling-side communication device, and performing connection control so that a call is originated from the calling-side communication device to the call destination user.

21. The communication control method according to claim 20, comprising:

in response to a call origination request from a user operating the mobile communication terminal having transmitted the used device information, considering a communication device corresponding to calling device information as a calling-side communication device and performing connection control, the calling device information being contained by the used device information and specifying a communication device to be used for originating a call.

22. A communication system comprising:

a connection control device performing connection control between given communication devices; and a mobile communication terminal capable of communicating with the connection control device, wherein the mobile communication terminal includes:

a used device information storing means for previously associating and storing designated location information designating a given location and used device information specifying a communication device to be used depending on a location;

a location information acquiring means for acquiring location information representing a location of the terminal itself; and a used device information transmitting means for transmitting the used device information associated with the designated location information corresponding to the location information acquired by the location information acquiring means, to the connection control device;

wherein the connection control device includes a connection controlling means for considering a communication device corresponding to the used device information transmitted from the mobile communication terminal as a communication device to be used by a user operating the mobile communication terminal having transmitted the used device information, and performing connection control of the communication device, wherein the used device information transmitting means included by the mobile communication terminal is configured to transmit the used device information containing calling device information specifying a communication device to be used for originating a call, to the connection control device, wherein the mobile communication terminal includes a call origination requesting means for transmitting call origination request information representing a request for origination of a call for a call destination user, to the connection control device, wherein the connection controlling means included by the connection control device is configured to, in response to a call origination request from a user operating the mobile communication terminal having transmitted the used device information, consider a communication device corresponding to the calling device information contained by the used device information as a calling-side communication device and perform connection control, and wherein the connection controlling means included by the connection control device is configured to, in response to the call origination request information transmitted from the mobile communication terminal, consider a communication device corresponding to the calling device information contained by the used device information transmitted from the mobile communication terminal having transmitted the call origination request information, as a calling-side communication device, and perform connection control so that a call is originated from the calling-side communication device to the call destination user.

23. A mobile communication terminal capable of communicating with a connection control device performing connection control between given communication devices, the mobile communication terminal comprising:

a used device information storing means for previously associating and storing designated location information designating a given location and used device information specifying a communication device to be used depending on a location;

a location information acquiring means for acquiring location information representing a location of the terminal itself; and a used device information transmitting means for transmitting the used device information associated with the designated location information corresponding to the location information acquired by the location information acquiring means, to the connection control device, wherein the used device information transmitting means is configured to transmit the used device information to the connection control device so that a communication device corresponding to the used device information is, as a communication device to be used by a user operating the terminal itself, subjected to connection control by the connection control device, wherein the used device information transmitting means included by the mobile communication terminal is configured to transmit the used device information containing calling device information specifying a communication device to be used for originating a call, to the connection control device, wherein the mobile communication terminal includes a call origination requesting means for transmitting call origination request information representing a request for origination of a call for a call destination user, to the connection control device, wherein the connection control device is configured to, in response to a call origination request from a user operating the mobile communication terminal having transmitted the used device information, consider a communication device corresponding to the calling device information contained by the used device information as a calling-side communication device and perform connection control, and wherein the connection control device is configured to, in response to the call origination request information transmitted from the mobile communication terminal, consider a communication device corresponding to the calling device information contained by the used device information transmitted from the mobile communication terminal having transmitted the call origination request information, as a calling-side communication device, and perform connection control so that a call is originated from the calling-side communication device to the call destination user.

24. A connection control device performing connection control between given communication devices, the connection control device comprising a connection controlling means for: receiving used device information from a mobile communication terminal capable of communicating, the used device information corresponding to location information of the mobile communication terminal acquired by the mobile communication terminal and being previously stored in the mobile communication terminal, and the used device information specifying a communication device to be used depending on a location; considering a communication device corresponding to the received used device information as a communication device to be used by a user operating the mobile communication terminal having transmitted the used device information; and performing connection control of the communication device, wherein the mobile communication terminal is configured to transmit the used device information containing calling device information specifying a communication device to be used for originating a call, to the connection control device, wherein the mobile communication terminal is configured to transmit call origination request information representing a request for origination of a call for a call destination user, to the connection control device, wherein the connection controlling means included by the connection control device is configured to, in response to a call origination request from a user operating the mobile communication terminal having transmitted the used device information, consider a communication device corresponding to the calling device information contained by the used device information as a calling-side communication device and perform connection control, and wherein the connection controlling means included by the connection control device is configured to, in response to the call origination request information transmitted from the mobile communication terminal, consider a communication device corresponding to the calling device information contained by the used device information transmitted from the mobile communication terminal having transmitted the call origination request information, as a calling-side communication device, and perform connection control so that a call is originated from the calling-side communication device to the call destination user.

* * * * *